United States Patent [19]  [11] 4,286,029
Murakami et al.  [45] Aug. 25, 1981

[54] DIVALENT SILVER OXIDE FOR USE IN PRIMARY CELL AND MANUFACTURING METHOD THEREOF

[75] Inventors: Kaoru Murakami, Hirakata; Mitsugu Okahisa, Kyoto; Tomohiko Arita; Kumano, Hiroshi, both of Osaka, all of Japan

[73] Assignee: Matsushita Electric Industrial Co., Ltd., Japan

[21] Appl. No.: 152,429

[22] Filed: May 22, 1980

Related U.S. Application Data

[60] Division of Ser. No. 83,937, Oct. 11, 1979, Pat. No. 4,231,889, which is a continuation-in-part of Ser. No. 935,314, Aug. 21, 1978, abandoned.

[30] Foreign Application Priority Data

Aug. 19, 1977 [JP] Japan .................................. 52/99666
Feb. 24, 1978 [JP] Japan .................................. 53/21393
Feb. 24, 1978 [JP] Japan .................................. 53/21394

[51] Int. Cl.³ ............................................ H01M 4/34
[52] U.S. Cl. .................................................... 429/219
[58] Field of Search ................ 429/219, 229; 423/604

[56] References Cited

U.S. PATENT DOCUMENTS 4,126,584 11/1978 Borbely ........................... 429/219 X Primary Examiner—Charles F. LeFevour
Attorney, Agent, or Firm—Wenderoth, Lind & Ponack

[57] ABSTRACT

The present invention relates to a divalent silver oxide for use in primary cells which is stable in an alkaline solution, slow in the speed of oxygen gas generation with favorable reproducibility and has X-ray diffraction peak values different from that of conventional divalent silver oxide and the method of manufacturing the divalent silver oxide of the above described type. By the employment of the divalent silver oxide according to the present invention, it is possible to produce, at low cost, batteries having high energy density per unit weight and volume, with small amount of gas generation to prevent swelling or expansion of the cells.

3 Claims, 35 Drawing Figures (X3000)

(X3000)

(X10000)

(X3000)

FIG.4 (×10000)
FIG.5 (×3000)
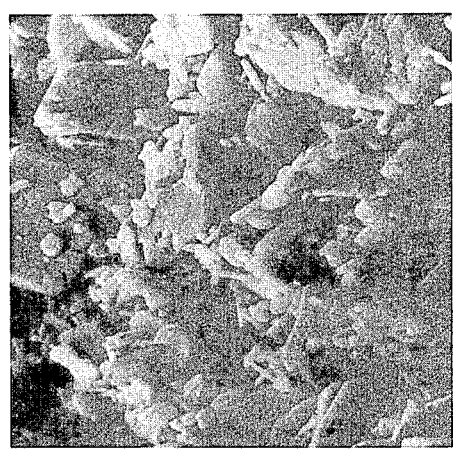
FIG.6 (×10000)
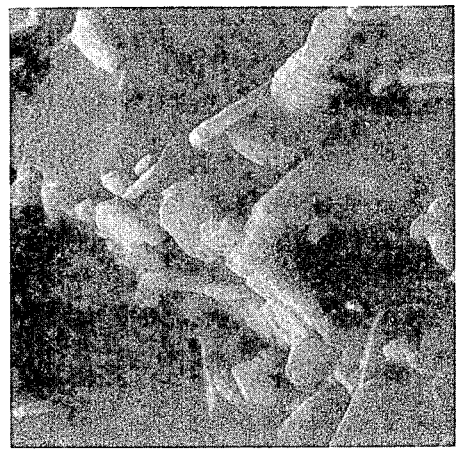

(X3000)

(X10000)

(X3000)

(X10000)

(X3000)

(X10000)

(X3000)

(X10000)

(X3000)

FIG.17 (X10000)
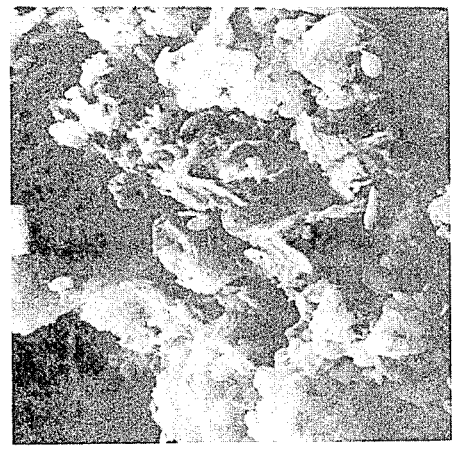
FIG.18 (X3000)
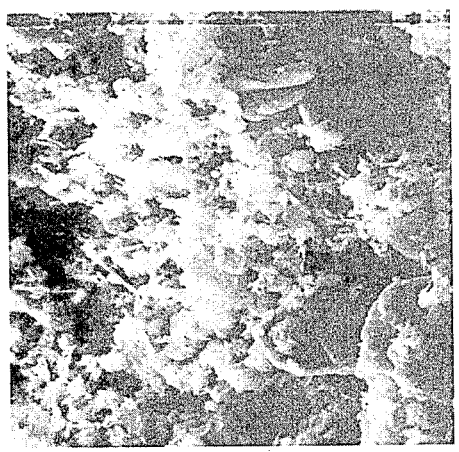
FIG.19 (X10000)
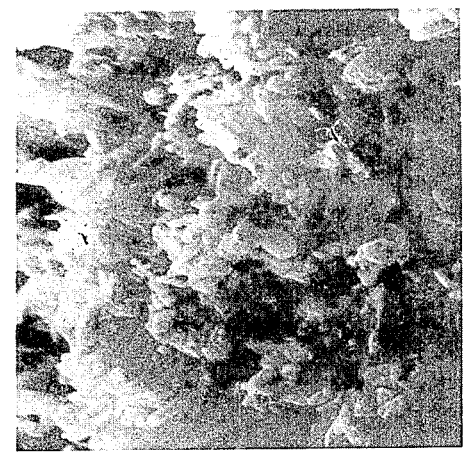

(X3000)

(X10000)

(X3000)

(X10000)

(X3000)

(X10000)

(X3000)

(X10000)

DIVALENT SILVER OXIDE FOR USE IN PRIMARY CELL AND MANUFACTURING METHOD THEREOF

This is a division of application Ser. No. 83,937, filed Oct. 11, 1979, now U.S. Pat. No. 4,231,889, which is a continuation-in-part of Ser. No. 935,314, filed Aug. 21, 1978, now abandoned.

BACKGROUND OF THE INVENTION

The present invention generally relates to a primary battery, and more particularly, to a divalent silver oxide for use in an alkaline cell and a method of manufacturing the same.

With the recent progress in the field of electronics, various electronic instruments, such as electronic calculators, electronic wrist watches and the like have been miniaturized in size, while compact and small-sized batteries of monovalent silver oxide ($Ag_2O$)-zinc(Zn) group have been commercialized and put into practical use as an external source of electric power for driving such electronic instruments. Following the further miniaturization of the electronic instruments, however, development of batteries of still smaller size is strongly demanded for practical use, and thus attention is now focused on batteries which employ, as positive electrode active material, divalent silver oxide (AgO) having higher energy density per unit weight and volume than the monovalent silver oxide ($Ag_2O$).

The divalent silver oxide or AgO as described above has the energy density per unit weight 1.87 times larger, and energy density per volume 1.94 times larger than the monovalent silver oxide or $Ag_2O$. Accordingly, if $Ag_2O$ is repalced by AgO to form an alkaline battery of AgO-Zn group, it becomes possible to increase the capacity by approximately 40% in the battery having the same dimensions and configuration. The divalent silver oxide presently available, however, is converted into a stable $Ag_2O$ through discharging of oxygen gas upon contact with an alkaline electrolyte, thus presenting problems, for example, in that the voltage developed extends over two stages of potential, i.e., the potential of AgO and that of $Ag_2O$, while it is very dangerous, since leakage of liquid or explosion due to increase of internal pressure may be involved unless there is provided some means to absorb the oxygen gas thus generated in the interior of the battery. Meanwhile, even when the battery is provided with the oxygen gas absorbing function in the interior thereof, the high energy of AgO is not fully utilized through reduction of volume efficiency within the battery, thus it being impossible to achieve the desired end to highly increase the capacity of the battery.

SUMMARY OF THE INVENTION

Accordingly, an essential object of the present invention is to provide a stable divalent silver oxide which is particularly suitable for use in an alkaline primary cell.

Another important object of the present invention is to provide a divalent silver oxide for use in an alkaline cell which is stable in an alkaline solution, slow in the speed of oxygen gas generation, and has a peak value different from that of the known divalent silver oxide in the X-ray diffraction chart, with substantial elimination of disadvantageous inherent in the conventional divalent silver oxides.

A further object of the present invention is to provide a method of manufacturing the divalent silver oxide of the above described type through simple processes in a large quantity and also at low cost for utilization thereof for production of alkaline cells having high energy density, with less generation of gas to eliminate the undesirable expansion or swelling of the cells.

In accomplishing these and other objects according to one example of the present invention, 48 g (2 times the reaction theoretical amount) of NaOH was dissolved into 1 l of water, with subsequent dissolving of 48.8 g (1.2 times of the reaction theoretical amount) of $K_2S_2O_8$ thereinto for maintaining the resultant solution at temperatures of from 0° to 60° C., i.e. at 0° C., 20° C., 40° C., 60° C., respectively, and a run at 80° C. was included for comparison. Then, a solution prepared by dissolving 51 g of $AgNO_3$ into 0.2 l of water was slowly added dropwise into said resultant solution over a sufficient period of 2 to 5 minutes, during which time, the reaction solution was continuously stirred at a predetermined speed until completion of the synthesis. The time intervals for synthesis at respective temperatures were 45 hours, 15 hours, 280 minutes, 100 minutes and 30 minutes in the order of the temperatures as described earlier, and after completion of the synthesis, the supernatant solution was discharged for washing sediments by distilled water, and subsequent to sufficient removal of alkaline component, drying was effected at drying temperatures lower than 60° C. to obtain the resultant AgO.

By the above procedure and procedures disclosed in other examples in the present application, a novel divalent silver oxide stable in alkaline solution, slow in oxygen generation and also having X-ray diffraction spectrum peak values different from that of the known divalent silver oxide has been provided, with an efficient method of manufacturing the divalent silver oxide of the above described type being simultaneously presented.

BRIEF DESCRIPTION OF THE DRAWINGS

These and other objects and features of the present invention will become apparent from the following description taken in conjunction with the preferred embodiments thereof with reference to the accompanying drawings, in which:

FIGS. 3 through 12 are similar photographs to those of FIGS. 1 and 2, but particularly show structures of AgO synthesized by the methods according to the present invention, FIGS. 14 through 21 are similar photographs to those in FIGS. 3 through 12, but particularly show structures of AgO in other examples of the present invention in which synthesis time of the AgO is varied.

DETAILED DESCRIPTION OF THE INVENTION

Figure 1:
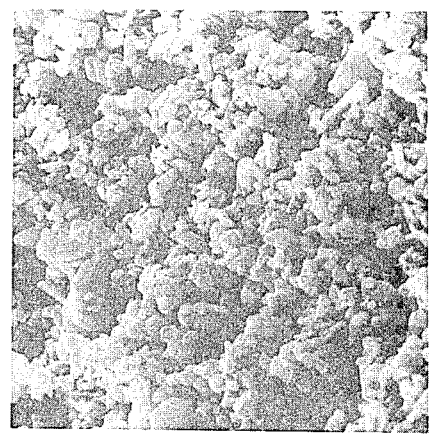
FIGS. 1 and 2 are photographs taken by a scanning type electron microscope and illustrating structures of divalent silver oxide (AgO) obtained by a conventional method of synthesis.

For meeting the requirements and achieving the objects as described in the foregoing, the present inventors have made investigation into AgO which is stable in an alkaline solution, and consequently, discovered AgO having an X-ray diffraction chart different from that of the conventionally reported AgO, and also a method of manufacturing thereof. It has also been made clear by the above investigation that in the relation of the gas generation characteristics of AgO with respect to the solid state properties thereof, there is a correlation between surface areas of particles fully formed into AgO and speed or rate of generation of oxygen gas, and that as assessed from the viewpoints of swelling or expansion and storing capacity of the battery, the surface areas of the AgO particles per unit weight should preferably be less than 0.5 m²/g.AgO.

Moreover, as a result of a further investigation carried out by the present inventors into a method of manufacturing stable AgO with a smaller amount of oxygen gas generation, AgO having less generation of gas and, as a new effect, high open circuit voltage maintaining characteristics at the formation of AgO-Zn group batteries has been obtained by adding cadmium chloride or cadmium oxide to a solution at the end of synthesization or composing according to the manufacturing method of the present invention. The present inventors have also made clear, in the investigation into the method of manufacturing AgO with less generation of gas, that the quality of cleaning or washing water largely affects the properties of the resultant AgO.

Generally, what requires a silver oxide manufacturer's attention with respect to the washing water is the influence of impurities such as positive ion, negative ion, etc. on such washing water, and for avoiding the adverse effect by the impurities as described above, it is a common practice to use distilled water in a laboratory scale, and industrially, to employ water passed through a plurality of tanks, which are combination of ion-exchange resin tanks and active carbon tanks, for eliminating the positive and negative ions or to adopt water prepared by causing original water, for example, city water to pass through a reverse osmosis membrane to obtain primary pure water which is subsequently passed through the active carbon tank and ion-exchange resin tank.

In the synthesis of AgO, the present inventors primarily used the distilled water for the investigation, taking the adverse effect of the initial impurities into consideration, and subsequently, when a large amount of washing water is required, employed the ion-exchange water, which was of high purity as demineralized water having specific resistance of 15 MΩ.cm. It was confirmed, however, that in the above case, there was a clear difference in the generation of gas between AgO washed by the demineralized water and that washed by the ion-exchange water of high purity. As a matter of fact, for producing AgO in a large quantity, it is almost impossible to use the distilled water for the manufacturing, since such distilled water is very expensive, costing 70,000 and 150,000 yen/ton, while the ion-exchange water costs only 2,000 to 3,500 yen/ton, thus presenting a large industrial value, if employable for the production of AgO.

Accordingly, the present inventors have made a study of factors for converting the stable AgO obtained by the synthesis into AgO which accelerates generation of unstable gas, and discovered that such factors reside in trace amounts of colloidal substance and microbes present in the high purity pure water and finely divided particles mainly composed of silicon and nitrogen.

Hereinbelow, features and effect of the present invention, and difference of AgO of the invention from the conventional AgO, etc. will be described.

A method of obtaining AgO by oxidizing silver nitrate ($AgNO_3$) in an alkaline solution with potassium persulfate ($K_2S_2O_8$) as oxidizing agent has conventionally been proposed, for example, by R. N. Hammer. Although the method as described above is suited to merely producing AgO, it is not suitable for manufacturing AgO to be used as the positive electrode active material, since the reaction from AgO to $Ag_2O$ mentioned earlier, i.e., the reaction represented by the following equation tends to be extremely expedited.

$$2AgO \rightarrow Ag_2O + \tfrac{1}{2}O_2$$

Therefore, the present inventors have investigated various synthesis conditions for AgO, and obtained novel AgO having an X-ray diffraction peak intensity markedly different from that of the conventional AgO, and further ensured that such novel AgO is stable in the alkaline solution.

In the methods conventionally proposed for synthesizing AgO, 72 g of sodium hydroxide (NaOH) is dissolved during stirring into 1 l of warm water kept at a temperature of approximately 85° C., to which solution 75 g of potassium persulfate ($K_2S_2O_8$) in the state of suspension is further added as oxidizing agent, with subsequent addition thereto of a water solution prepared by dissolving 51 g of silver nitrate $AgNO_3$ into as small an amount of water as possible. The whole solution thus obtained is stirred for 15 minutes, while being kept at a temperature of 90° C. After the above stirring, sediments of black AgO are taken out from the solution allowed to stand for subsequent washing and drying thereof to obtain the resultant AgO.

The reaction as described above is represented by a reaction equation as given below.

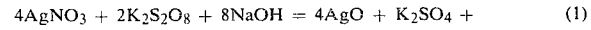

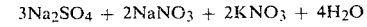

$$4AgNO_3 + 2K_2S_2O_8 + 8NaOH = 4AgO + K_2SO_4 + \quad (1)$$

$$3Na_2SO_4 + 2NaNO_3 + 2KNO_3 + 4H_2O$$

In the above case, 75 g of $K_2S_2O_8$ employed for synthesizing 51 g of $AgNO_3$ into AgO is 1.85 times the reaction theoretical amount in the above equation (1), while 72 g of NaOH is 3.0 times of the reaction theoretical amount in said equation (1). Upon review of the stabilizing factors for AgO based on the above described conditions, it has been made clear that, with respect to the synthesizing temperature, AgO is formed even at a temperature lower than 90° C., and that more stable AgO can rather be obtained when synthesized at temperatures lower than 90° C. and more preferably at below 60° C. In the above investigation, it has also been clarified that the required amount of NaOH for the alkaline substance has only to be of such an extent as will not fundamentally reduce pH of the reaction group lower than 9, while the amount of $K_2S_2O_8$ as the oxidizing agent may be of necessary minimum level sufficient to alter $AgNO_3$ into AgO. Upon further investigation into the synthesis method of new AgO on the basis of the above results, novel AgO stable in the alkaline solution and having specific properties in the X-ray diffraction peak intensity has been synthesized and such specific properties and effect thereof will be described hereinbelow with reference to examples for illustrating the present invention, without any intention of limiting the scope thereof.

EXAMPLE 1

48 g (2 times the reaction theoretical amount) of NaOH was dissolved in 1 l of water with subsequent dissolving of 48.8 g (1.2 times of the reaction theoretical amount) of $K_2S_2O_8$ thereinto for maintaining the resultant solution at temperatures of 0° C., 20° C., 40° C. and 60° C., respectively and at 80° C. for comparison, while a solution prepared by dissolving 51 g of $AgNO_3$ in 0.2 l of water was slowly added dropwise into said resultant solution over a sufficient period of 2 to 5 minutes, during which time, the reaction solution was continuously stirred at a predetermined speed until completion of the synthesis. The time intervals for synthesizing at respective temperatures were set to be 45 hours, 15 hours, 280 minutes, 100 minutes and 30 minutes in the order of the temperatures as described earlier, and after completion of the synthesis, the supernatant solution was discharge for washing sediments by distilled water, and subsequent to sufficient removal of alkaline component, drying was effected at drying temperatures lower than 60° C. to obtain AgO.

The results of the X-ray diffraction of AgO produced under the synthesis conditions as described above were compared with a standard chart (A.S.T.M. or American Society for Testing and Materials) of AgO shown in the following Table 1 and results of AgO obtained through the conventionally reported synthesis conditions.

It should be noted that in the standard chart (A.S.T.M.) of Table 1, face intervals (d), peak value intensities (I/Io) and crystal faces (hKL) are extracted, and particularly, that the peak value relative intensity ratio when the peak value intensity of the face (111) (face interval d=$2.41_3$Å) is taken as 100, is represented by I/Io(1).

TABLE 1

| dA | I/Io | hKL | I/Io(I) |
|---|---|---|---|
| 2.791 | 47 | 200 | 53 |
| 2.767 | 100 | 11$\bar{1}$ | 112 |
| 2.621 | 38 | 002 | 43 |
| 2.413 | 89 | 111 | 100 |

TABLE 1-continued

| dA | I/Io | hKL | I/Io(I) |
|---|---|---|---|
| 2.283 | 38 | 20$\bar{2}$ | 43 |
| 1.394 | 9 | 31$\bar{3}$ | 10 |
| 1.383 | 8 | 22$\bar{2}$ | 9 |

Meanwhile, in Table 2, the relation between d and I/Io(I) obtained when AgO of EXAMPLE 1 is subjected to the X-ray diffraction under conditions of voltage 35 KV, current 10 mA, case factor 8, time constant 2 and scanning speed or rate 2° (2$\phi$/min) with the use of a copper anticathode and nickel filter, is shown together with the standard chart and results of AgO synthesized in a solution kept at the synthesis temperature of 90° C. as conventionally proposed.

TABLE 2

| dA | I/Io(I) of A.S.T.M. | I/Io(I) of AgO by conventional synthesizing method | I/Io(I) for AgO in EXAMPLE 1 | | | | |
|---|---|---|---|---|---|---|---|
| | | | 1 | 2 | 3 | 4 | 5 |
| 2.791 | 53 | 79 | 824 | 709 | 655 | 200 | 237 |
| 2.767 | 112 | 136 | — | — | — | 194 | 207 |
| 2.621 | 43 | 42 | 29 | 32 | 29 | 37 | 36 |
| 2.413 | 100 | 100 | 100 | 100 | 100 | 100 | 100 |
| 2.283 | 43 | 40 | 29 | 34 | 30 | 40 | 36 |
| 1.394 | 10 | 12 | 67 | 62 | 55 | 23 | 27 |

In the data for I/Io(I) for EXAMPLE I of the above Table 2, the numerals 1, 2, 3, 4 and 5 represent cases wherein the synthesis is effected with the solution heated up to temperatures of 0° C., 20° C., 40° C., 60° C. and 80° C. respectively. As is clear from Table 2, AgO produced by the conventional synthesizing conditions show values generally equal to the peak value relative intensities I/Io(I) described in A.S.T.M., while AgO according to EXAMPLE 1 have been remarkably increased in the values of I/Io(I) at the face (200) (face interval, d=$2.79_1$Å), face (11$\bar{1}$) (face interval, d=$2.76_7$Å), face (31$\bar{3}$) (face interval, d=$1.394$Å), and face (400) (face interval, d=$1.39_5$Å). Although there are portions where I/Io(I) are not given due to impossibility of separation from the face (200) in the X-ray diffraction conditions, such separation is possible in other measuring conditions, with I/Io(I) also showing strong values. Meanwhile, the entry of very strong peak value relative intensities [I/Io(I)] for the face interval d=$1.394$A implies that the secondary diffraction peak face (400) (face interval, d=$1.39_5$A) for the face (31$\bar{3}$) (face interval, d=$1.394$Å) and face (200) (face interval, d=$2.79_1$Å) has become strong, and since it is difficult to correctly separate the both surfaces in the X-ray diffraction chart under the earlier described measuring conditions and the face interval (d) and peak value intensity for the face (400) are not given in the A.S.T.M. chart, the indication is given by the face interval d=$1.394$A for convenience. AgO in EXAMPLE 1 is in the form of crystal having a marked growth on the faces (200) and (11$\bar{1}$), with consequent weakening of the peak value relative intensities (I/Io(I)) on the faces (002) (face interval, d=$2.62_1$ Å) and (20$\bar{2}$) (face interval, d=$2.28_3$ Å), and differs from the conventionally reported AgO in the specific properties thereof in the X-ray diffraction chart.

Subsequently, properties of AgO in EXAMPLE 1 with respect to the oxygen gas generation speed in the alkaline solution will be described hereinbelow.

The oxygen gas generating rate as mentioned above is tabulated in Table 3 below based on acceleration tests (average value of 4 hours' measurements) wherein the above mentioned samples were immersed in a water solution of 10 mol KOH/l at a temperature of 70° C.

TABLE 3

|  | AgO by conventional synthesizing method | AgO in EXAMPLE 1 | | | | |
|---|---|---|---|---|---|---|
|  |  | 1 | 2 | 3 | 4 | 5 |
| gas generating rate ($\mu$l/hr/g) | 60–120 | 18 | 18 | 17 | 28 | 30 |

It should be noted that samples 1 to 5 in Table 3 correspond to the samples 1 to 5 in Table 2.

As is seen from the above results in Table 3, AgO according to the conventional synthesizing methods tend to be decomposed in the alkaline solution, with consequent fast oxygen gas generating speed and a large deviation in quality, thus lacking in reliability. On the contrary, AgO of EXAMPLE 1 according to the present invention is slow in decomposition in alkaline solution and low in oxygen gas generating speed, with favorable reproducibility and stability in the alkaline substance, and is considered to have results in agreement with the results of the X-ray diffraction mentioned earlier. It should be noted here that under the synthesis conditions as described above, a certain temperature dependence is noticed, and although AgO having the gas generating rate smaller than the conventional AgO and specific properties noticeable in the X-ray diffraction chart can be obtained even under the synthesis conditions in which NaOH and $K_2S_2O_8$ are restricted to a temperature of 90° C., there are certain problems related to the reproducibility and setting of the conditions.

As can be seen from Table 3, the rate of gas generation rises dramatically when reaction temperatures in excess of 80° C. are employed. Accordingly, reaction temperatures of 0° to 60° C. are employed.

Figure 2:
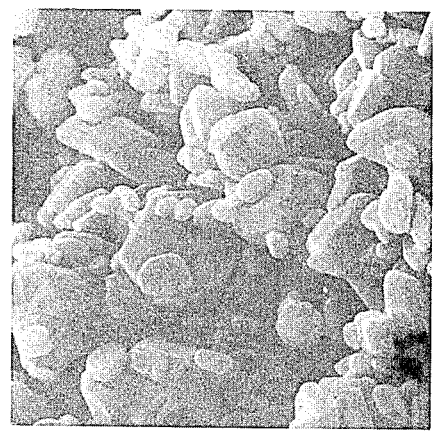
Figure 3:
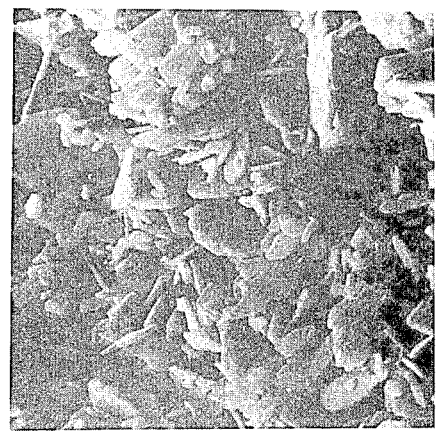
Figure 7:
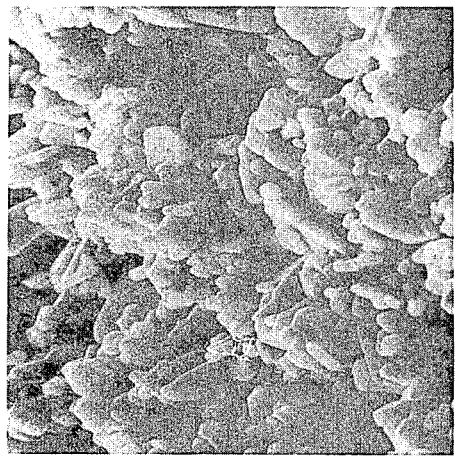
Figure 8:
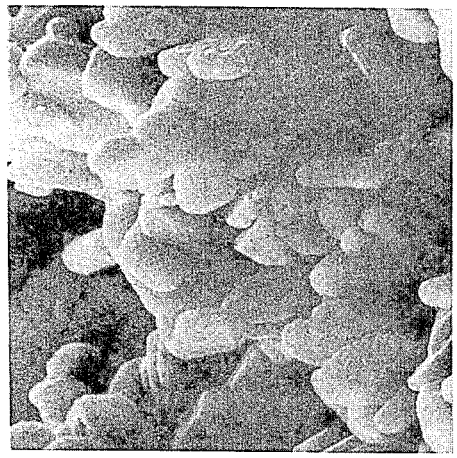
Figure 9:
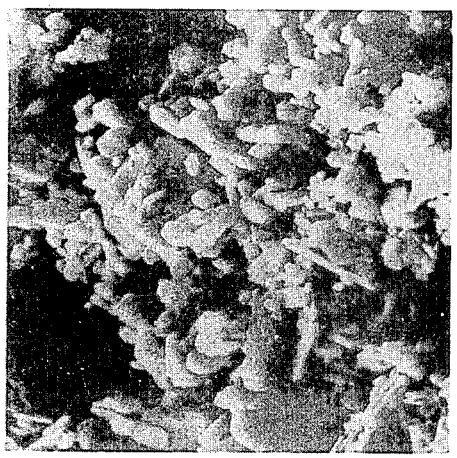
Figure 10:
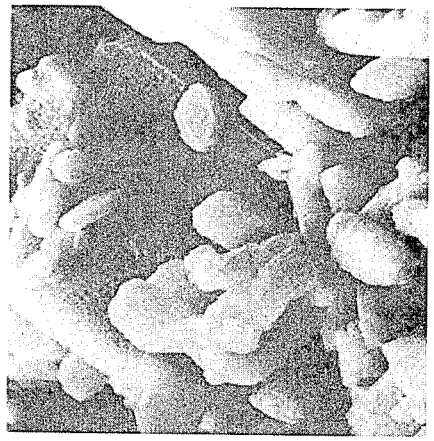
Figure 11:
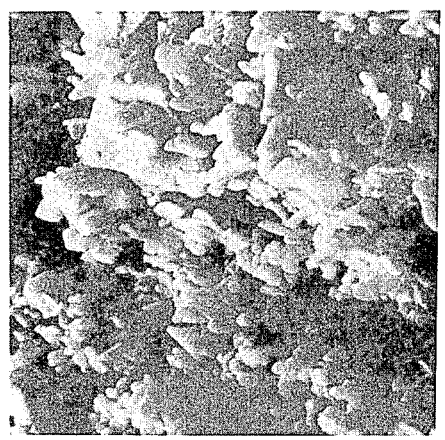
Figure 12:
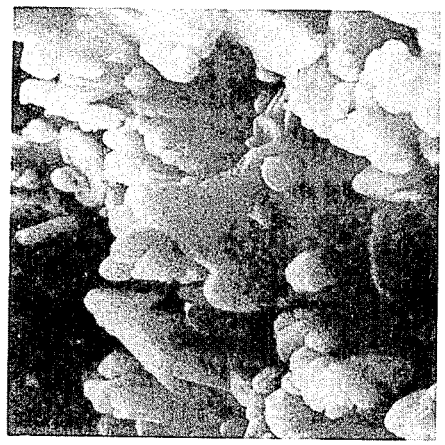

Referring now to the drawings, there are shown in FIGS. 1 through 12 photographs taken by a scanning type electron microscope and illustrating particle configurations and size of AgO synthesized in the manner as described in the foregoing, in which the odd numbered photographs are of 3,000× magnification, while the even numbered photographs are of 10,000× magnification. The photographs of FIGS. 1 and 2 show structures of AgO obtained by the conventional synthesis method at 90° C. mentioned earlier at the magnifications of 3,000 and 10,000 respectively. Meanwhile, the photographs of FIGS. 3 to 12 show structures of AgO according to EXAMPLE 1 of the present invention, and FIGS. 3 and 4 relate to AgO synthesized at 0° C., FIGS. 5 and 6 to AgO synthesized at 20° C., FIGS. 7 and 8 to AgO synthesized at 40° C., FIGS. 9 and 10 to AgO synthesized at 60° C., and FIGS. 11 and 12 to AgO synthesized at 80° C.

As is clear from these photographs, the particles of AgO produced by the conventional synthesizing methods have configurations comparatively close to cubic shape, while in AgO of EXAMPLE 1 according to the present invention, there are present many plate-like particles, with few particles having configurations close to cubic structures.

EXAMPLE 2

48 g (2 times the reaction theoretical amount) of NaOH was dissolved in 1 l of water, with subsequent dissolution of 48.8 g (1.2 times the reaction theoretical amount) of $K_2S_2O_8$ thereinto for maintaining the resultant solution at temperatures of 40° C. and 60° C. respectively, while a solution prepared by dissolving 51 g of $AgNO_3$ in 0.2 l of water was added dropwise into the above mixed solution of NaOH and $K_2S_2O_8$ over a sufficient period of 2 minutes for the synthesis reaction. The synthesis reaction was interrupted at 70, 140, 210 and 280 minutes for the synthesis at 40° C., and at 40, 50, 100, 150 and 200 minutes for the synthesis at 60° C., and thereafter, AgO were obtained in the similar process as in EXAMPLE 1. The X-ray diffraction results of these AgO are tabulated in Tables 4 and 5 below.

TABLE 4

| dA | $I/I_o(I)$ of A.S.T.M. | $I/I_o(I)$ for AgO synthesized at 40° C. | | | |
|---|---|---|---|---|---|
|  |  | 70 min. | 140 min. | 210 min. | 280 min. |
| 2.791 | 53 | 104 | 159 | 563 | 278 |
| 2.767 | 112 | 149 | 158 | — | — |
| 2.621 | 43 | 51 | 42 | 30 | 28 |
| 2.413 | 100 | 100 | 100 | 100 | 100 |
| 2.283 | 43 | 39 | 37 | 34 | 31 |
| 1.394 | 10 | 14 | 20 | 90 | 33 |

TABLE 5

| dA | $I/I_o(I)$ of A.S.T.M. | $I/I_o(I)$ for AgO synthesized at 60° C. | | | | |
|---|---|---|---|---|---|---|
|  |  | 40 min. | 60 min. | 100 min. | 150 min. | 200 min. |
| 2.791 | 53 | 377 | 160 | 655 | 217 | 113 |
| 2.767 | 112 | — | 155 | — | 164 | 152 |
| 2.621 | 43 | 40 | 35 | 29 | 27 | 42 |
| 2.413 | 100 | 100 | 100 | 100 | 100 | 100 |
| 2.283 | 43 | 34 | 35 | 30 | 32 | 37 |
| 1.394 | 10 | 35 | 22 | 55 | 24 | 17 |

Figure 13:
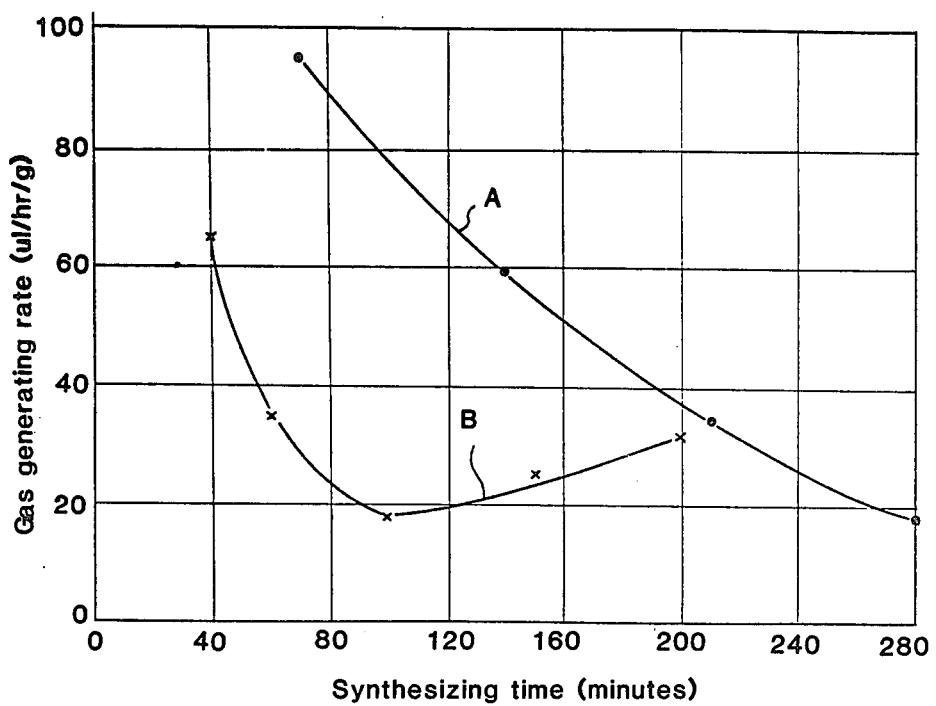
FIG. 13 is a graph showing relation of synthesizing time and gas generation rate of AgO according to EXAMPLE 2 of the present invention.
Figure 14:
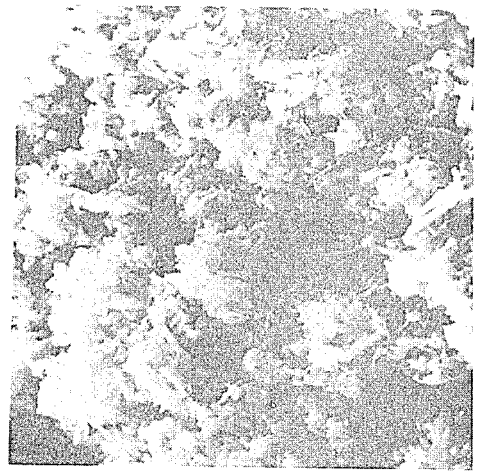
Figure 15:
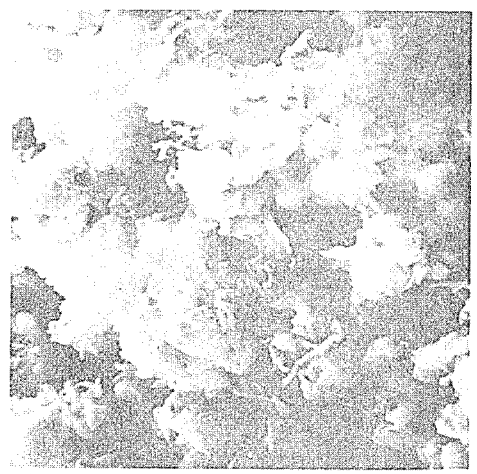
Figure 16:
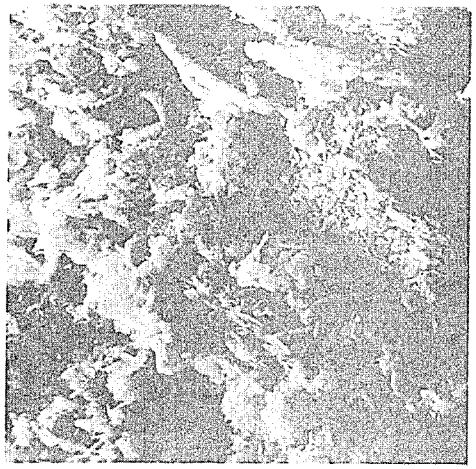
Figure 20:
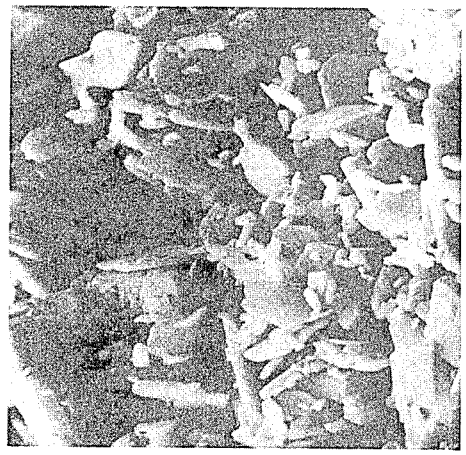
Figure 21:
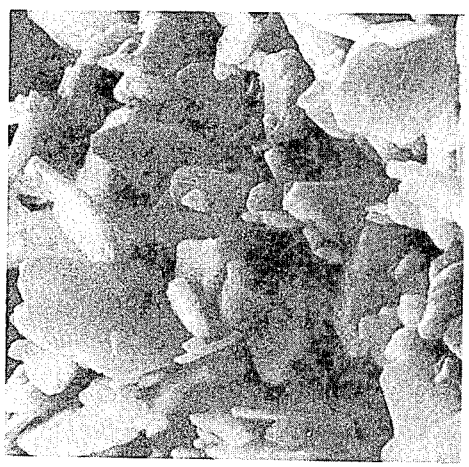

In the graph of FIG. 13, there is shown the relation between the oxygen gas generating speeds or rates and synthesis time for the above described AgO in which graph, a curve A represents results of synthesis at 40° C. and a curve B shows those at 60° C. Meanwhile, in FIGS. 14 through 21, there are shown photographs taken by the scanning type electron microscope and illustrating the process of formation of AgO synthesized at a temperature of 40° C. FIGS. 14 and 15 show AgO particles and undeveloped products at the synthesis of 70 minutes, FIGS. 16 and 17 those at the synthesis of 140 minutes, FIGS. 18 and 19 those at the synthesis of 210 minutes, and FIGS. 20 and 21 those at the synthesis of 280 minutes, with the magnification of 3,000 for the even numbered photographs and of 10,000 for the odd numbered photographs. When the above results are observed on the whole, it is noticed that the X-ray diffraction charts, oxygen gas generating speeds in the alkaline solution, AgO particle configurations, AgO formation rate, etc. of the product (AgO) are different depending on the time for interrupting the synthesis reaction even in the same synthesis ingredients (weight of the chemical agent employed is constant). Although not shown in Tables 4 and 5, in the results of the X-ray diffraction, the X-ray diffraction chart for AgO synthesized at 40° C. shows the peak value of $Ag_2O$ at the synthesis time of 70 minutes and 140 minutes, with presence of the peak for $Ag_2O$ being noticed even at 210 minutes to a certain extent. In the synthesis at 60° C., such peaks of $Ag_2O$ are observed at 40 and 60 minutes. From the above fact and observation of the oxygen gas generation of AgO in the alkaline solution, it is seen that, if the formation into AgO at the synthesis is not sufficient, even AgO showing the specific peak value relative intensity (I/Io)(I) in the X-ray diffraction chart may not always exhibit sufficient effect with respect to the object of the present invention. For one example, the relation between the degree of AgO formation (degree of oxidization) and oxygen gas generation speed with respect to the synthesis time at 40° C. is given in Table 6, in which the degree of oxidization is obtained on the basis of a method employing ferrous sulfate.

TABLE 6

|  | AgO synthesized at 40° C. | | | |
| --- | --- | --- | --- | --- |
|  | 70 min. | 140 min. | 210 min. | 280 min. |
| Gas generation rate ($\mu$l/hr/g) | 85 | 59 | 30 | 18 |
| Degree of oxidization (wt %) | 50 | 84 | 91 | 96 |

Moreover, judging from the curve A showing the gas generating rate in FIG. 13, AgO according to the present invention can not be characterized unless the specific properties are noticed in the X-ray peak value relative intensity (I/Io)(I) at the degree of AgO formation (degree of oxidization) over 90 wt %.

Although large differences are noticed in the optimum synthesis time of AgO depending on weights and concentration of reagent used and synthesizing temperatures, the factor for time in the same synthesizing conditions is always in the optimum value (time), with subsequent increasing trend with respect to the gas generation.

Accordingly, when AgO is formed under various synthesizing conditions, the gas generating state will be as shown by the curve B in FIG. 13 unless the reaction is interrupted at the optimum time. When such influence is observed with respect to the peak value relative intensities (I/Io)(I) of the X-ray diffraction chart, a gradually increasing trend is noticed with a subsequent decreasing tendency. Such a trend is approximately in agreement with the relation between the synthesizing time and gas generating rate, although the relation thereof with respect to the particle configurations in the electron microscope photographs is unknown.

The photographs by the electron microscope in FIGS. 14 to 21 definitely show the process for crystallization of AgO, and the uncrystallized substance at the initial stage of the synthesis varies with time to become AgO having plate-like beautiful surfaces developed into planar structure.

EXAMPLE 3

Following the similar synthesis procedures as in EXAMPLES 1 and 2, the investigation was particularly made as to the amounts of NaOH. 25.2 g (1.05 times the reaction theoretical amount), 48.0 g (2 times the reaction theoretical amount), 72.0 g (3 times the reaction theoretical amount) and 144 g (6 times the reaction theoretical amount) of NaOH were each dissolved in 1 l of water, with subsequent dissolving of 40.6 g (1 time the reaction theoretical amount) of $K_2S_2O_8$ in the respective NaOH water solutions, and the resultant solutions thus prepared were maintained at a synthesizing temperature of 60° C., with further addition thereto of water solution containing 51 g of $AgNO_3$ for reaction to obtain AgO after subsequent washing and drying. Upon investigation into the X-ray diffraction properties and gas generating rate of the resultant AgO in the same conditions as in EXAMPLE 1, results as shown in the following Tables 7 and 8 were obtained.

TABLE 7

| I/Io(I) of | | AgO I/Io(I) Amount of NaOH | | | |
| --- | --- | --- | --- | --- | --- |
| dA | A.S.T.M. | 1.05 times | 2 times | 3 times | 6 times |
| 2.791 | 53 | 184 | 255 | 331 | 110 |
| 2.767 | 112 | 152 | — | — | 128 |
| 2.621 | 43 | 31 | 27 | 30 | 40 |
| 2.413 | 100 | 100 | 100 | 100 | 100 |
| 2.283 | 43 | 31 | 31 | 32 | 38 |
| 1.394 | 10 | 23 | 35 | 36 | 15 |

TABLE 8

|  | Amount of NaOH | | | |
| --- | --- | --- | --- | --- |
|  | 1.05 times | 2 times | 3 times | 6 times |
| Gas generating rate ($\mu$l/hr/g) | 33 | 17 | 18 | 36 |

In EXAMPLE 3, it was ensured that the peak value relative intensity (I/Io)(I) for the X-ray diffraction chart showed specific properties as compared with the conventional AgO at the amounts of NaOH 1.06 to 6.0 times the reaction theoretical amount, and that the synthesis of AgO stable in the alkaline solution was possible. It is to be noted, however, that the amount of NaOH with respect to silver chloride has factors affecting crystal size of AgO, gas generating rate of the synthesized AgO, etc., one example of which is given below.

EXAMPLE 4

Figure 22:
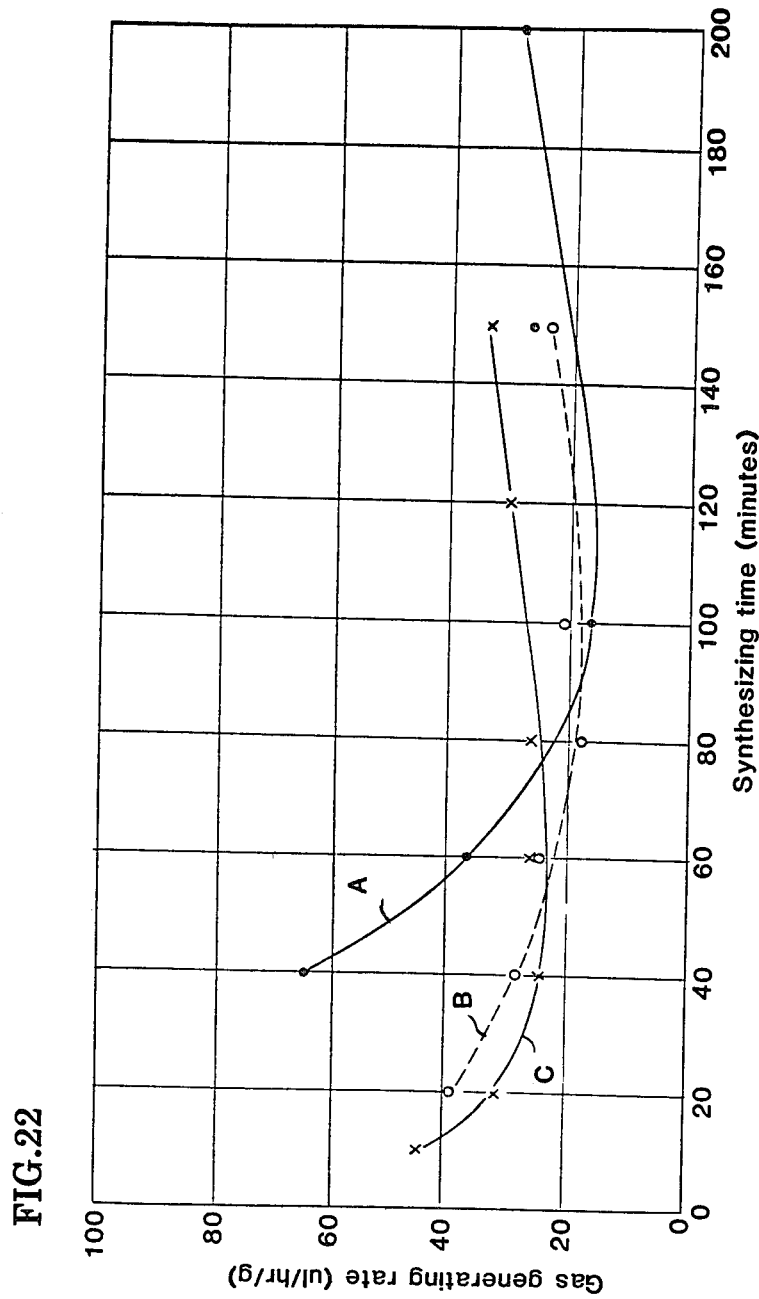
FIG. 22 is a similar graph to that in FIG. 13, but particularly shows relation of synthesis time and gas generating rate with reference to EXAMPLES 3 and 4 of the invention.

In the similar synthesis procedures in EXAMPLES 1 and 2, 30 g (1.25 times the reaction theoretical amount), 36 g (1.5 times the reaction theoretical amount), and 4.8 g (2.0 times the reaction theoretical amount) of NaOH were each dissolved in 1 l of water, with subsequent dissolving of 48.8 g (1.2 times the reaction theoretical amount) of $K_2S_2O_8$ in the respective NaOH water solutions, and the resultant solutions thus prepared were maintained at a temperature of 60° C., to which, water solution of 51 g of $AgNO_3$ was added for investigation into the gas generating rate in the alkaline solution, X-ray diffraction peak value relative intensities (I/Io)(I), structures in the electron microscope photographs and optimum synthesizing time of AgO obtained through varied reaction time intervals. The graph of FIG. 22 shows the tendency of AgO formation speed, and relation between the synthesis time and gas generating rate. In FIG. 22, the curve A shows results at the NaOH amount 2 times the reaction theoretical amount, the curve B at the NaOH amount 1.5 times the reaction theoretical amount, and the curve C 1.25 times the reaction theoretical amount. From the graph of FIG. 22, it is clear that the formation time of AgO is largely affected by the concentration of NaOH, and that the gas generation is adversely affected, if the synthesizing time is longer than necessary. It is to be noted, however, that such AgO formation time can be established only in certain limited conditions, and may be varied, for example, with variation of the stirring speed or other factors. Table 9 below shows the X-ray diffraction relative intensities (I/Io)(I).

TABLE 9

| | | I/Io(I) of AgO | | |
| | | NaOH amount with respect to reaction theoretical amount | | |
| dA | I/Io(I) of A.S.T.M. | 1.25 times | 1.50 times | 2.00 times |
| --- | --- | --- | --- | --- |
| 2.791 | 53 | 138 | 358 | 655 |
| 2.767 | 112 | 163 | — | — |
| 2.621 | 43 | 38 | 31 | 29 |
| 2.413 | 100 | 100 | 100 | 100 |
| 2.283 | 43 | 38 | 29 | 30 |
| 1.394 | 10 | 20 | 29 | 55 |

Figure 23:
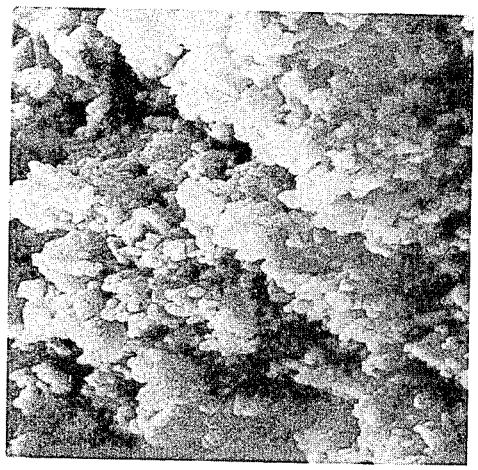
FIGS. 23 through 28 are similar photographs to those in FIGS. 3 through 12, but particularly show crystal state of AgO in which alkaline concentration is varied.
Figure 24:
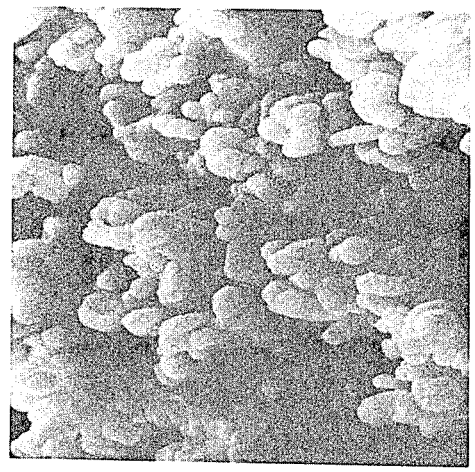
Figure 25:
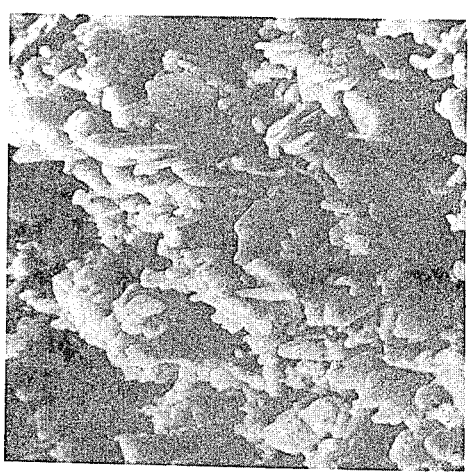
Figure 26:
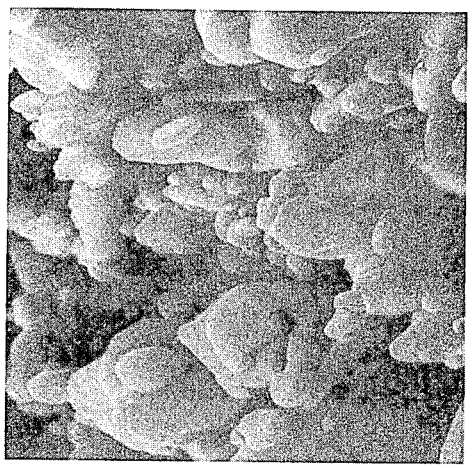
Figure 27:
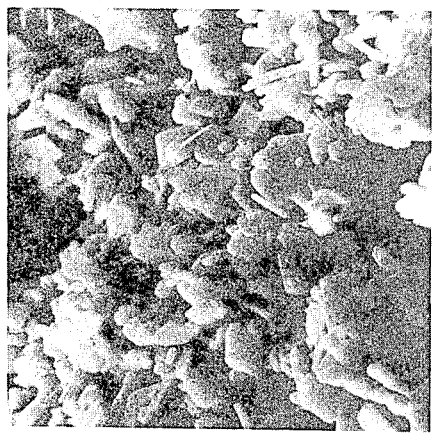
Figure 28:
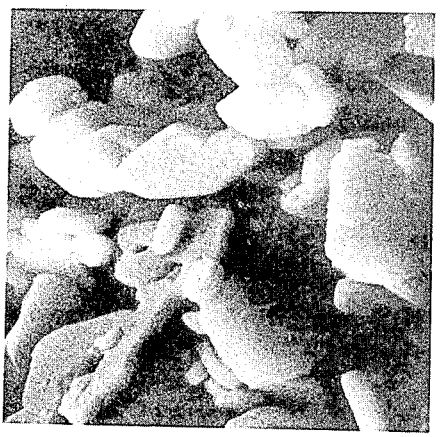

In the above Table 9, when the peak value relative intensities I/Io(I) for the optimum synthesis time in the respective NaOH concentration are observed, the specific properties of AgO according to the present invention are noticed, while the influence of NaOH concentration on AgO crystallization is also clearly seen, and it is considered that there exists the optimum concentration in NaOH. Representative examples of the photographs of the above AgO taken by the scanning type electron microscope are shown in FIGS. 23 through 28, in which FIGS. 23 and 24 represent the case where the NaOH amount is 1.25 times the reaction theoretical amount, FIGS. 25 and 26 the case where the NaOH amount is 1.5 times the reaction theoretical amount, and FIGS. 27 and 28 the case where the NaOH amount is 2 times the reaction theoretical amount. In the above photographs, regarding the relation of the amount of NaOH to the particle configurations of AgO, any difference is hardly noticeable between the case where the NaOH amount used is 1.5 times the reaction theoretical amount and the case where the NaOH amount used is 2 times the reaction theoretical amount, but at the NaOH amount 1.25 times the reaction theoretical amount, the particles become finer. Such results are in close agreement with the relation between the gas generating rate and X-ray diffraction peak value relative intensities, and show that there is a certain natural limitation to the synthesization in the alkali of low concentration.

EXAMPLE 5

Following the synthesis procedures similar to those in EXAMPLES 1 and 2, AgO was synthesized at a temperature of 60° C., with the amount of NaOH used being 3 times the reaction theoretical amount and with the amounts of $K_2S_2O_8$ used being varied into 1.0, 1.2, 1.5 and 1.80 times the reaction theoretical amounts. The results of the X-ray diffraction peak value relative intensities for the above AgO are tabulated in Table 10 below.

TABLE 10

| | | I/Io(I) of AgO | | | |
| | | $K_2S_2O_8$ amount | | | |
| dA | I/Io(I) of A.S.T.M. | 1.0 times | 1.2 times | 1.5 times | 1.80 times |
| --- | --- | --- | --- | --- | --- |
| 2.791 | 53 | 461 | 431 | 404 | 175 |
| 2.767 | 112 | — | — | — | 135 |
| 2.621 | 43 | 30 | 30 | 37 | 34 |
| 2.413 | 100 | 100 | 100 | 100 | 100 |
| 2.283 | 43 | 31 | 32 | 30 | 36 |
| 1.394 | 10 | 39 | 38 | 35 | 17 |

Figure 29:
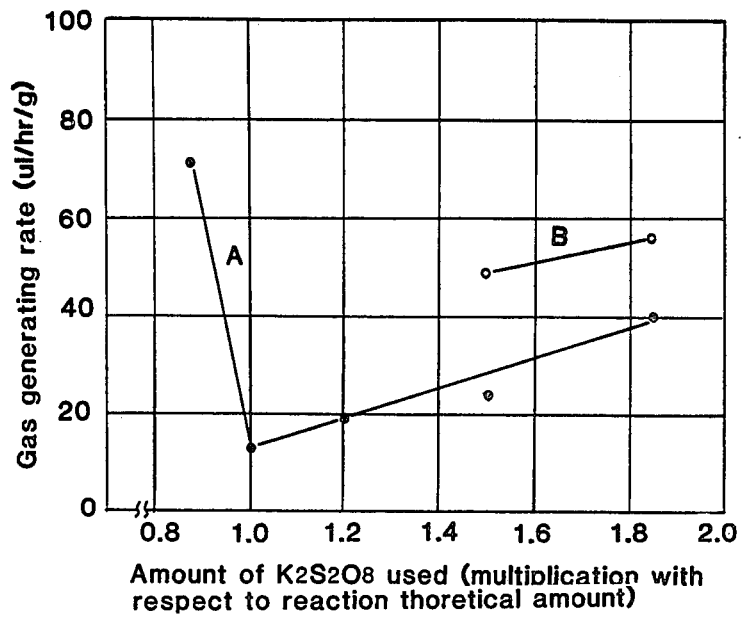
FIG. 29 is a graph showing relation between amount of oxidizing agent and gas generating rate with reference to AgO of the present invention.

Meanwhile, results of the gas generating rate test carried out at a temperature of 70° C. with the use of 10 mol KOH/l water solution through 4 hours' measurements are shown in the graph of FIG. 29 together with part of reference data. In FIG. 29, the line A represents the result of synthesis at 60° C. when the amounts of $K_2S_2O_8$ are altered from 0.88 to 1.85 times the reaction theoretical amount, while the line B shows the result of synthesizing at 80° C. Thus, the importance of not exceeding 60° C. is further established. The amount of $K_2S_2O_8$ is a major factor in determining the properties of crystal growth and gas generation of AgO, and, if more than necessary, will have an adverse effect by increasing the gas generation. On the contrary, if the synthesis is effected with an amount of $K_2S_2O_8$ smaller than that which is required in the synthesis reaction equation (1) referred to earlier, stable AgO can not be obtained due to an increase in the gas generation. Moreover, the $K_2S_2O_8$ amount is closely related to the synthesis temperature, and in a comparison in which the same amounts of $K_2S_2O_8$ are employed, synthesis at high temperatures is affected extremely adversely. From the foregoing results, the $K_2S_2O_8$ amounts for obtaining favorable results may be said to be over the reaction theoretical amount and from 1.0 to 1.8 times the reaction theoretical amount which are close to said reaction theoretical amount. The peak value relative intensities (I/Io(I)) in the X-ray diffraction in Table 10 show special characteristics of AgO according to the present invention, with results corresponding to the relation of the gas generating rate.

EXAMPLE 6

Figure 30:
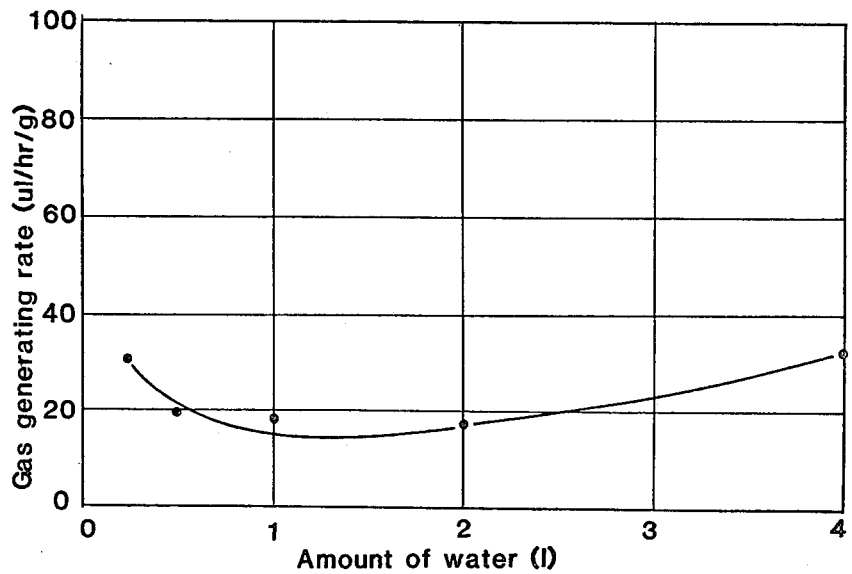
FIG. 30 is a graph showing relation between the amount of water employed and gas generation rate with reference to AgO of the present invention.

48 g (2 times the reaction theoretical amount) of NaOH was dissolved in each of 4 l, 2 l, 1 l and 0.25 l of water for reaction solvent medium, with subsequent dissolving thereinto of 48.8 g (1.2 times the reaction theoretical amount) of $K_2S_2O_8$ for maintaining a temperature of 60° C., and a solution prepared by dissolving 51 g of $AgNO_3$ into 0.2 l of water is added dropwise into the $NaOH.K_2S_2O_8$ solution over a period of 2 minutes for synthesis, thus AgO being obtained through subsequent washing by distilled water and drying at a temperature of 60° C. The AgO thus obtained was subjected to the peak value relative intensity measurements in the X-ray diffraction under the same conditions as in EXAMPLE 1, the results of which are given in Table 11 below, while FIG. 30 shows the relation between the amount of water as the reaction solvent medium and gas generating rate.

TABLE 11

| | | I/Io(I) of AgO | | | |
| | | Amount of water | | | |
| dA | I/Io(I) of A.S.T.M. | 4l | 2l | 1l | 0.25l |
| --- | --- | --- | --- | --- | --- |
| 2.791 | 53 | 138 | 430 | 357 | 125 |
| 2.767 | 112 | 163 | — | — | 134 |
| 2.621 | 43 | 38 | 33 | 30 | 34 |
| 2.413 | 100 | 100 | 100 | 100 | 100 |
| 2.283 | 43 | 38 | 30 | 32 | 39 |
| 1.394 | 10 | 20 | 38 | 35 | 16 |

Meanwhile, Table 12 below shows a conversion of the $NaOH.K_2S_2O_8$ concentration (mol/l) under the above synthesis conditions with respect to the amount (l) of water to be used as the solvent medium.

TABLE 12

| | Amount of water used | | | |
| | 4l | 2l | 1l | 0.25l |
| --- | --- | --- | --- | --- |
| NaOH concentration (mol/l) | 0.3 | 0.6 | 1.2 | 4.8 |
| $K_2S_2O_8$ concentra- | | | | |

TABLE 12-continued

| | Amount of water used | | | |
|---|---|---|---|---|
| | 4 l | 2 l | 1 l | 0.25 l |
| tion (mol/l) | 0.045 | 0.090 | 0.18 | 0.72 |

In the concentration range of NaOH and $K_2S_2O_8$ of Table 12, AgO having specific properties as compared with the conventional AgO can favorably be synthesized with respect to the gas generating rate, and X-ray diffraction peak value relative intensities. In the synthesis as described above, the concentrations (mol/l) of NaOH and $K_2S_2O_8$ mentioned earlier are of course important factors, but at the same time, the respective amounts thereof previously mentioned are also important. For example, 240 g (20 times the reaction theoretical amount, concentration 1.2 mol/l) of NaOH and 244 g (12 times the reaction theoretical amount, concentration 0.18 mol/l) were dissolved into 5 l of water, with subsequent addition of a water solution of 25.5 g of $AgNO_3$ thereto, and the resultant solution was stirred at 60° C. for 100 minutes to synthesize AgO. When the AgO thus obtained was immersed in a water solution of 10 mol KOH/l at 70° C. for the acceleration test, the resultant gas generation rate was large at 273 μl/hr/g, which was extremely inferior with respect to the object of the present invention. The above results show that the concentration of the chemical agent (mol/l) during the synthesis and the quantity of the chemical agent necessary for the synthesis reaction as mentioned earlier are extremely important factors, and that alkali and oxidizing agent of proper concentrations are required in proper amounts.

EXAMPLE 7

(i) 48.8 g (1.2 times the reaction theoretical amount) of $K_2S_2O_8$ was dissolved in 1 l of water, and the resultant solution was maintained at a temperature of 60° C. Subsequently, a solution prepared by dissolving 51 g of $AgNO_3$ in 0.2 l of water was added to said resultant solution during stirring, with subsequent addition thereto of 48 g (2.0 times the reaction theoretical amount) of NaOH after 10 minutes for synthesizing AgO.

(ii) 48 g of NaOH was dissolved into 1 l of water, to which solution being stirred, a solution prepared by dissolving 51 g of $AgNO_3$ into 0.2 l of water and maintained at a temperature of 60° C. was added, and after 10 minutes, 48.8 g of $K_2S_2O_8$ was added to the resultant solution for synthesizing AgO.

(iii) 48 g of NaOH and 48.8 g of $K_2S_2O_8$ were dissolved into 1 l of water, to which solution being stirred, a solution prepared by dissolving 51 g of $AgNO_3$ into 0.2 l of water and maintained at a temperature of 60° C. was added for synthesizing AgO.

The resultant AgO obtained by the above synthesizing conditions (i) to (iii) were subjected to the gas generation rate test through 4 hours' measurements in a water solution of 10 mol KOH/l at a temperature of 70° C., the results of which are shown in Table 13 below.

TABLE 13

| | AgO Synthesis Conditions | | |
|---|---|---|---|
| | (i) | (ii) | (iii) |
| Gas generating rate (μl/hr/g) | 72 | 22 | 18 |

In the composing condition (i), $HNO_3$ and $H_4SO_4$ are produced in the following process through reaction between $AgNO_3$ and $K_2S_2O_8$.

$$2AgNO_3 + K_2S_2O_8 \rightarrow Ag_2S_2O_8 + 2KNO_3 \quad (A)$$

$$Ag_2S_2O_8 + 2H_2O \rightarrow 2AgO + 2H_2SO_4 \quad (B)$$

$$2KNO_3 + 2H_2SO_4 \rightarrow K_2SO_4 + 2HNO_3 + H_2SO_4 \quad (C)$$

$HNO_3$ and $H_2SO_4$ thus produced again decompose the formed AgO into silver chloride, with generation of $O_2$ gas. If such a reaction takes place at an early stage of synthesization, AgO finally obtained will show results undesirable for the object of the present invention, even when NaOH is added thereafter. On the contrary, in the conditions (ii) and (iii) wherein NaOH is present in the reacting solution during the dripping of $AgNO_3$, the reaction process for decomposing the formed AgO is absent, and thus, stable AgO can be synthesized. In the above conditions (ii) and (iii), AgO is considered to be formed through fundamentally the same processes which are shown in the form of reaction equations below.

$$2AgNO_3 + 2NaOH \rightarrow 2AgOH + 2NaNO_3 \quad (D)$$

$(2AgOH \rightarrow Ag_2O + H_2O$ in part$)$ $$2AgOH + K_2S_2O_8 + 2NaOH \rightarrow 2AgO + K_2SO_4 + Na_2SO_4 + 2H_2O \quad (E)$$

For further confirmation, when sedmiments formed in 2 to 3 minutes after the dropwise addition of the $AgNO_3$ solution in the above conditions (iii) were examined by X-ray diffraction, the peak of $Ag_2O$ was noticed. Meanwhile, at a synthesis temperature of 25° C., no peak for AgO was noticed, with only the peak for $Ag_2O$ being observed. From the above findings, the synthesizing conditions (ii) and (iii) are the same in the AgO synthesis process, though different from each other in the procedures for the synthesis.

It should be noted that although the AgO synthesizing methods as described in the foregoing employ $AgNO_3$ as the starting substance, AgO may be obtained through similar synthetic procedure, even when a silver halide such as AgF, AgCl, etc., is employed instead of $AgNO_3$. It should be also noted that AgO can be synthesized as represented by the following reaction equation, even if $Ag_2SO_4$ is employed as silver chloride, $$Ag_2SO_4 + K_2S_2O_8 + 4NaOH = 2AgO + K_2SO_4 + 2Na_2SO_4 + 2H_2O$$

and more specifically, by EXAMPLE 8 described hereinbelow.

EXAMPLE 8

48 g (2 times the reaction theoretical amount) of NaOH was dissolved in 1 l of water, with subsequent dissolving thereinto of 48.8 g (1.2 times the reaction theoretical amount) of $K_2S_2O_8$ to maintain the resultant solution at a temperature of 60° C., and then 46.8 g of silver sulfate ($Ag_2SO_4$) in the powder form was added to said NaOH and $K_2S_2O_8$ solution during stirring for forming $Ag_2SO_4$ into AgO. After completion of the synthesis, the supernatant solution was removed for subsequent washing by distilled water until the alkaline component was sufficiently removed, and the resultant AgO was obtained after drying at a drying temperature below 60° C. The AgO thus obtained was subjected to the X-ray diffraction analysis and gas generating rate measurements under the conditions as mentioned earlier for comparison with AgO according to the conventional method, with the results as shown in Table 14 below.

TABLE 14

| dA | I/Io(I) of A.S.T.M. | I/Io(I) of conventional AgO | I/Io(I) of AgO in EXAMPLE 8 |
|---|---|---|---|
| 2.791 | 53 | 79 | 252 |
| 2.767 | 112 | 136 | 220 |
| 2.621 | 43 | 42 | 39 |
| 2.413 | 100 | 100 | 100 |
| 2.283 | 43 | 40 | 35 |
| 1.394 | 10 | 12 | 31 |

Meanwhile, the gas generating rate of AgO of EXAMPLE 8 was 25 $\mu$l/hr/g.

As is seen from EXAMPLE 8, it is possible to compose AgO characterized in the X-ray diffraction peak value relative intensities and having a low gas generation rate, even with silver sulfate ($Ag_2SO_4$) of small solubility.

Similarly, it is possible to synthesize AgO different from the conventional AgO by oxidizing silver oxide ($Ag_2O$) employed as starting substance in a mixed solution of $K_2S_2O_8$ and NaOH, in which case, the reaction equation is considered to be $$Ag_2O + K_2S_2O_8 + 2NaOH = 2AgO + K_2SO_4 + Na_2SO_4 + H_2O$$

More specifically, AgO as described above may be obtained by EXAMPLE 9 described below.

EXAMPLE 9

24 g (2 times the reaction theoretical amount) of NaOH was dissolved in 1 l of water, with subsequent dissolution of 48.8 g (1.2 times the reaction theoretical amount) of $K_2S_2O_8$ thereinto, and the resultant solution was maintained at a temperature of 60° C. In the next step, 34.8 g of $Ag_2O$ in the powder form was added to said solution for synthesis, and after completion of the synthesis, the supernatant solution was removed for subsequent washing by distilled water until the alkaline component is thoroughly removed, and after drying at a drying temperature below 60° C., AgO was obtained. The resultant AgO was subjected to the X-ray diffraction analysis and gas generating rate measurements under the conditions as described earlier for assessment, and the X-ray diffraction peak value relative intensities thereof are shown in TABLE 15 below.

TABLE 15

| dA | I/Io(I) of A.S.T.M. | I/Io(I) of conventional AgO | I/Io(I) of AgO in EXAMPLE 9 |
|---|---|---|---|
| 2.791 | 53 | 79 | 220 |
| 2.767 | 112 | 136 | 190 |
| 2.621 | 43 | 42 | 37 |
| 2.413 | 100 | 100 | 100 |
| 2.283 | 43 | 40 | 40 |
| 1.394 | 10 | 12 | 25 |

The gas generating rate of AgO in EXAMPLE 9 was 23 $\mu$l/hr/g.

The method of manufacturing AgO according to the present invention is characterized in that, in setting the synthesis conditions of AgO, AgOH or $Ag_2O$ is first formed for subsequent formation thereof into AgO, and such synthesis conditions are affected by the synthesis temperatures, amounts, concentration and composing time of NaOH and $K_2S_2O_8$. Accordingly, the hydroxide of alkaline metal used in the AgO manufacturing is not limited to NaOH, but it is possible to set the synthesis conditions by employing KOH, LiOH, RbOH and $C_sOH$ at the same composition ratio and concentration as NaOH for obtaining AgO having features. Moreover, the silver chloride $AgNO_3$ to be employed may be replaced by silver salts including silver halide and silver sulfate such as AgF, AgCl, etc. Furthermore, $K_2S_2O_8$ described as employed in the foregoing examples as oxidizing agent for silver chloride may be replaced by other persulfate, for example, $(NH_4)_2S_2O_8$ and $Na_2S_2O_8$ without any inconvenience.

As is seen from the foregoing description, in the present invention, it has been made possible to produce AgO having the peak value relative intensities largely different from those of the X-ray diffraction chart (A.S.T.M.) for the conventional AgO as a result of the investigation made into the synthesis conditions with the object to obtain AgO stable in the alkaline solution. The resultant AgO having such features is slow in the decomposition thereof in the alkaline solution with the oxygen gas generating rate being reduced to $\frac{1}{2}$–1/10 that of AgO manufactured under the conventionally reported synthesizing conditions, with remarkably favorable results.

Figure 31:
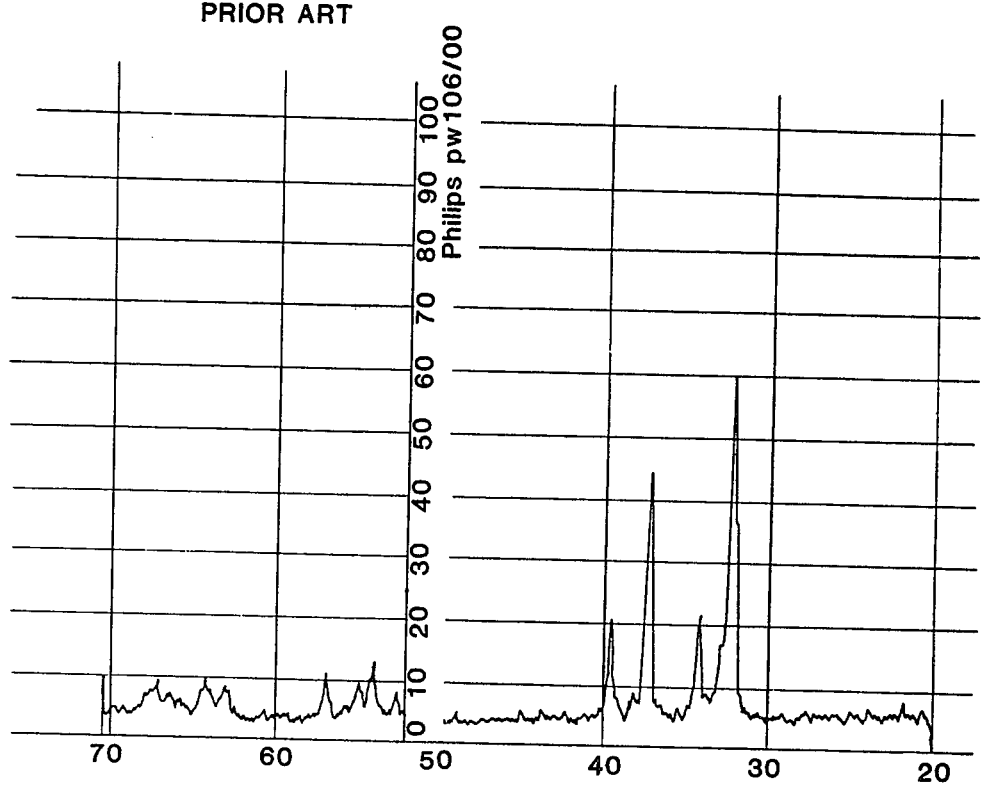
FIG. 31 is an X-ray diffraction chart for the conventional AgO.
Figure 32:
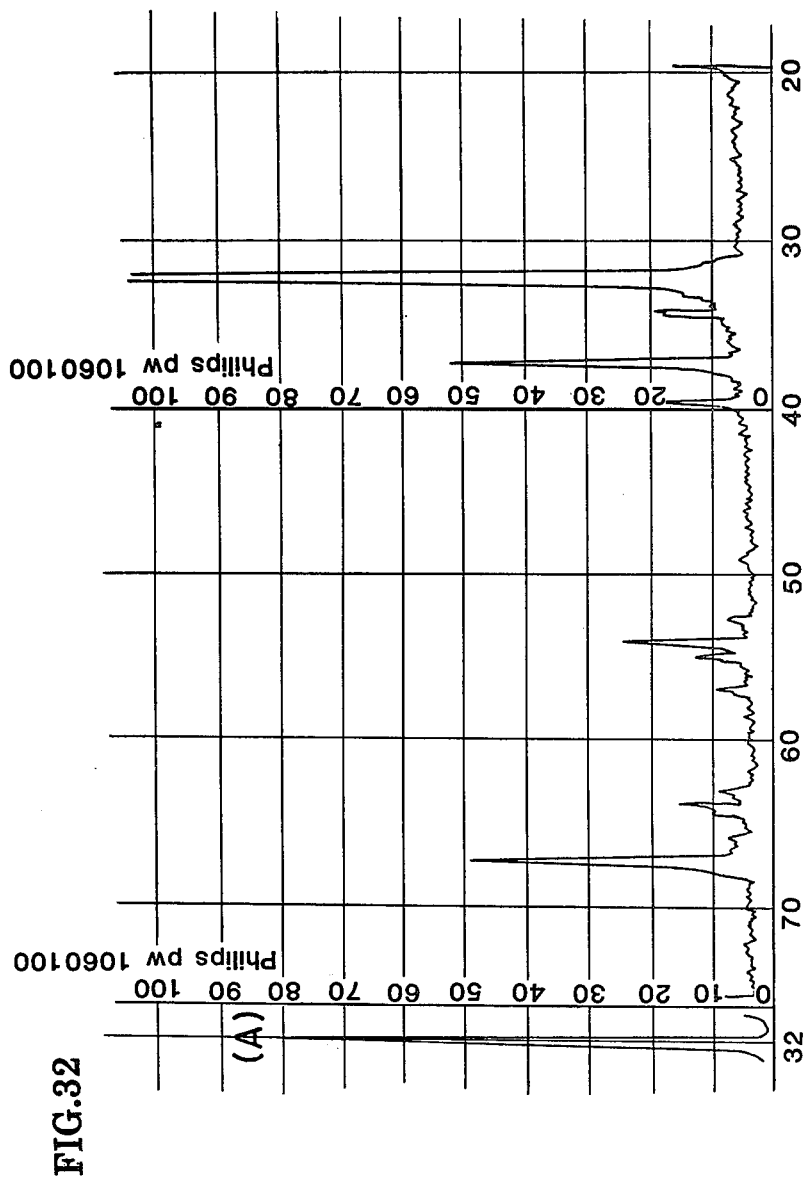
FIG. 32 is a similar chart to FIG. 31, but particularly shows results of AgO obtained according to the method of the present invention.

Referring now to FIGS. 31 and 32, there are shown X-ray diffraction charts of the conventional AgO (FIG. 31) and AgO of the present invention (FIG. 32) based on the X-ray diffractometer method. Regarding the X-ray diffraction conditions, the anticathode of copper and filter of nickel were employed, with voltage of 35 KV, current of 10 mA, case factor of 8 (in the portion where the diffraction peak was "scaled out", case factor of 64 was separately taken), time constant of 2, and scanning speed of 2° (2$\phi$/min.). In FIGS. 31 and 32, numerical values entered in the abscissa denote degress for 2$\phi$. In the chart of FIG. 32, characteristics of AgO of the present invention are illustrated at face intervals (d) of 2.791, 2.767 and 1.394 (1.395$_5$), and since the peaks of 2.791 and 2.767 could not be taken by the case factor 8, results taken at the scale factor 64 was shown as (A) at the end of the chart. Under the above conditions, although the peak of (A) is represented by one peak, the face intervals (d) 2.791 and 2.767 can be separated from each other upon projection of X-rays, with the sample of AgO being rotated at a low speed, and on the assumption that the peak value strength of 2.791 is 100, the peak value relative intensity of 2.767 is 28, with the crystal face (200) of AgO remarkably developed, thus indicating that the AgO of the present invention has characteristics extremely different from the conventional AgO.

With employment of AgO of the present invention obtained in the above described manner as positive electrode active material, an AgO-Zn group alkaline battery, for example, silver peroxide battery of R-44 type of IEC (International Electrotechnical Commission, ISO, Geneva) standards having diameter of 11.9 mm, and height of 4.2 mm was formed for the expansion test at 30 days' preservation at a temperature of 60° C. For the positive electrode active material, (I) AgO prepared under the conventional composing conditions, (II) AgO according to the present invention, and (III) AgO of the present invention to which $Ag_2O$ of 50 wt % was added are respectively used, with 2 parts of fine particles of 4 ethylene fluoride being mixed with 100 parts of each of the positive electrode active materials, and with subsequent employment of 0.6 g of respective mixtures for pressurized molding into the positive electrode. Additionally, the electrolyte employed was prepared by dissolving zinc oxide into a water solution of 10 mol KOH/l, while for the negative electrode active material, amalgamated zinc amalgamated only by 10 wt % was employed at an electric capacity of 170 mAH, with oxidation-resistant material being employed as a separator.

Results of expansion or swelling of the above described battery are shown in Table 16 below.

TABLE 16

| Positive electrode active material | After storing for 30 days at 60° C. | | |
|---|---|---|---|
| | I | II | III |
| Height of swelling of battery | 0.95 | 0.01 | 0.004 |

The expansion or swelling of the batteries (II) and (III) employing the positive electrode active material prepared by AgO of the present invention and the mixture of AgO of the present invention and $Ag_2O$ was almost free from any problems in terms of battery dimensions. On the contrary, the swelling of battery (I) having the conventional AgO as the positive electrode active material was too large to be allowable.

As is clear from the above findings, when batteries are constituted with the use of AgO according to the present invention, the object of the present invention can fully be satisfied.

Figure 33:
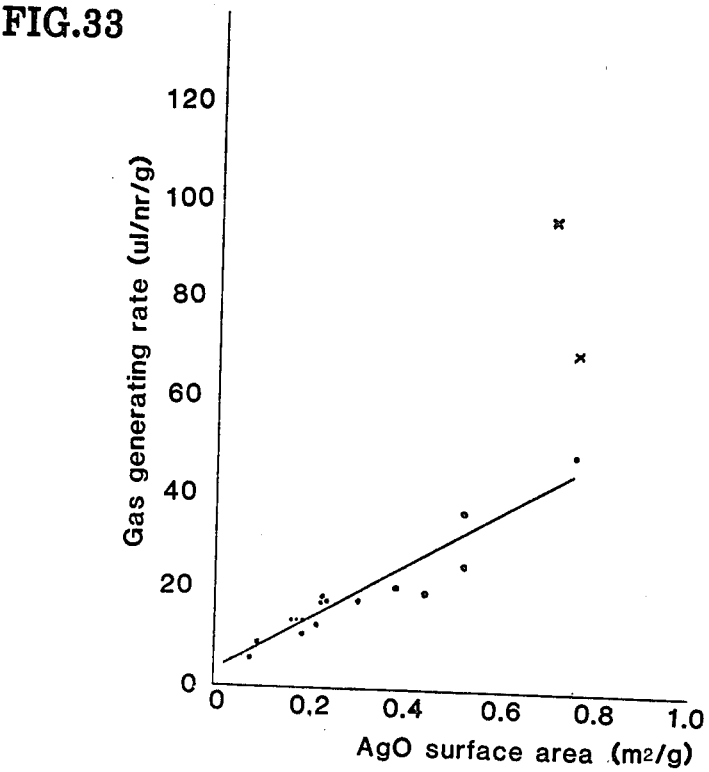
FIG. 33 is a graph showing relation between the surface areas of AgO of the invention and gas generating rate.

Subsequently, on the various AgO particles obtained in the foregoing investigation into the synthesizing conditions, AgO purity was determined by the oxidation-reduction analyzing method of chemical analysis, and samples having values from 96 to 100% were selected for measuring AgO surface areas by the BET method, and then the relation between such surface areas ($m^2/g$) and gas generating capacity ($\mu l/hr/g$) in 4 hours' measurements at 10 mol KOH, and 70° C. was studied. In the results of the above investigation shown in FIG. 33, those plotted by the mark X had the peak of $Ag_2O$ in the X-ray diffraction chart, with low AgO purity of 85 to 91%, and were deviated from a linear tendency, while there exists a linear relation between the surface areas and gas generating capacity in the AgO sample of high purity having AgO purity of 96 to 100% in the chemical analysis, without the $Ag_2O$ peak noticed in the X-ray diffraction chart, and the AgO having smaller surface area had better gas generating capacity. The state of gas generation of AgO varies depending on the state of contact (e.g. pellet configuration of AgO, amount and concentration of electrolyte, etc.) between the AgO and alkaline electrolyte, and therefore, for finding the range of the surface areas for AgO to meet the object of the present invention, silver peroxide batteries of R-44 type of IEC standards each having diameter of 11.9 mm and height of 4.2 mm were constituted with the use of AgO having known surface areas under the same constituting conditions as described earlier for comparison of swelling of the batteries and remaining capacity (%) after storing at 70° C. For the comparison, three kinds of AgO, i.e., (1) 0.18 $m^2/g$ AgO (gas generating rate 14 $\mu l/hr/g$), (2) 0.50 $m^2/g$ AgO (33 $\mu l/hr/g$), and (3) 0.75 $m^2/g$ AgO (49 $\mu l/hr/g$) were employed. Results of swelling and remaining capacity of the above described batteries after 15 days' storing at 70° C. are given in Table 17 below.

TABLE 17

| | AgO surface area ($m^2/g$) | | |
|---|---|---|---|
| | After storing for 15 days at 70° C. | | |
| | 0.18 | 0.50 | 0.75 |
| Height of Swelling of battery (mm) | 0.01 | 0.05 | 0.16 |
| Remaining Capacity (%) | 95 | 91 | 83 |

For the assessment of AgO performance with respect to batteries, oxygen absorption by the negative electrode (Zn) must be taken into account besides the swelling, and therefore, the battery after storing was discharged with a small current through a high resistance of 6.5 KΩ for comparison with the discharge capacity before storing so as to relatively evaluate the oxygen gas amount generated at AgO. As a result of the above assessment, it has been made clear that the surface area of AgO usable for batteries should be less than 0.5 $m^2/g$.

Subsequently, based on the AgO manufacturing method described in the foregoing, investigation has been made into a manufacturing method of still more stable AgO, with the result that by adding cadmium chloride or cadmium oxide to the AgO solution synthesized through the method described in the foregoing, AgO having less gas generation, and also provided with such a new effect that open circuit voltage is sufficiently maintained upon constitution of AgO-Zn system batteries, was advantageously obtained. Hereinbelow, example therefor will be given together with the comparative experimental data according to the known method.

COMPARATIVE EXPERIMENT 48 g of NaOH was dissolved in 1 l of water, with subsequent dissolving of 48.8 g of $K_2S_2O_8$ thereinto for maintaining at a temperature of 60° C., and into the resultant solution thus obtained, a solution prepared by dissolving 51 g of $AgNO_3$ in 0.1 l of water was gradually added dropwise over a sufficient period of 2 to 5 minutes. In the above case, the reaction solution was stirred at a constant speed for completion of the synthesis in 100 minutes. After completion of the synthesis, the supernatant solution was eliminated for subsequent washing by distilled water to sufficiently remove the alkaline component, and thus AgO was obtained after drying at a temperature below 60° C.

EXAMPLE 10

Figure 34:
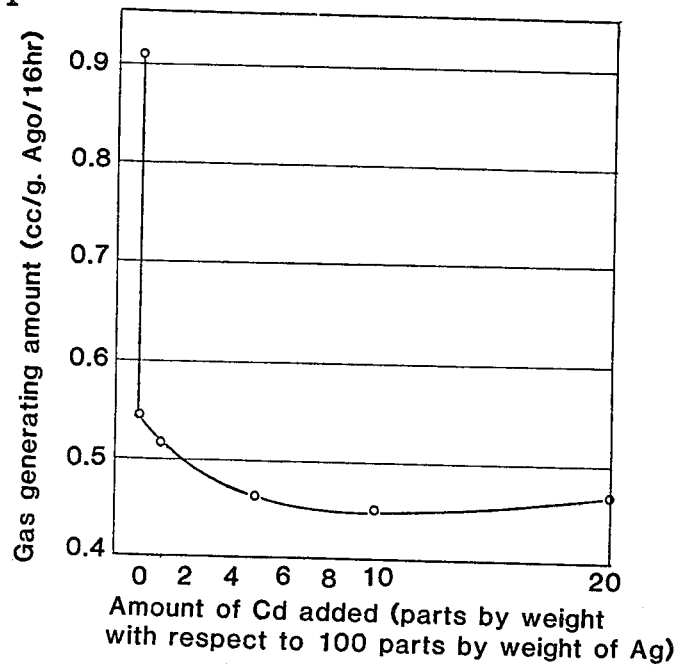
FIG. 34 is a graph showing relation between the amount of Cd added to AgO of the invention and gas generating amount.

After synthesizing the AgO solution according to the conditions and procedures described with reference to the above comparative experiment, water solutions of cadmium nitrate of (i) $Cd(NO_3)_2.4H_2O$ 0.044 g/50 ml, (ii) $Cd(NO_3)_2.4H_2O$ 0.89 g/50 ml, (iii) $Cd(NO_3)_2.4H_2O$ 4.45 g/50 ml and (iv) $Cd(NO_3)_2.4H_2O$ 17.78/50 ml separately prepared were added dropwise into the AgO solution over a period of approximately 1 minute, with subsequent reaction for 10 minutes after completion of the addition Upon termination of the synthesis, the supernatant solution was removed for washing by distilled water to sufficiently remove the alkaline component, and thus, AgO each having a different amount of cadmium addition was obtained after drying at a temperature below 60° C. In a graph of FIG. 34, there are shown the gas generating capacities of the AgO (blank) obtained by the comparative experiment, and of the 4 kinds of AgO having cadmium added thereto according to the above EXAMPLE 10, as compared with respect to the gas generating amounts obtained in 16 hours' test within a KOH water solution of 10 mol concentration at 70° C. In the above case, the amounts of addition of $Cd(NO_3)_2.4H_2O$ were 0.05 part by weight for (i), 1 part by weight for (ii), 5 parts by weight for (iii) and 20 parts by weight for (iv) with respect to the Ag weight of 100 of $AgNO_3$, and Cd present in AgO is considered to be in the state of CdO. Therefore, the effect was noticed even when cadmium oxide was added after the AgO synthesization, but the results were inferior to those of FIG. 34. In the results of FIG. 34, it has been made clear that by forming AgO through utilization of part of the AgO synthesizing method mentioned earlier and thereafter, adding $Cd(NO_3)_2$ for synthesizing, stable AgO with still smaller gas generation can be obtained. It is to be noted here that the amount of cadmium to be added may be more than 0.05 part by weight with respect to 100 parts by weight of Ag, and addition of cadmium by more than 20 parts by weight is meaningless upon consideration of energy density of AgO.

Hereinbelow, results of an investigation carried out by the present inventors into the time point for addition of $Cd(NO_3)_2$ are given.

For AgO synthesis, the simplest method is to employ the solution prepared by adding $Cd(NO_3)$ to the $AgNO_3$ solution, but in this case, addition of cadmium takes no effect, and, on the contrary, has adverse effects, with acceleration of gas generation. The above fact shows that mere addition of cadmium is not significant, but that what is really important is to find the particular state of AgO crystal growth at which cadmium is to be added.

EXAMPLE 11

(I) 48 g of NaOH was dissolved into 1 l of water, with subsequent dissolution of 48.8 g of $K_2S_2O_8$ thereinto for maintaining at a temperature of 60° C., and into the resultant solution thus obtained, a solution prepared by dissolving 51 g of $AgNO_3$ and 1.79 g of $Cd(NO_3)_2.4H_2O$ into 0.1 l of water was added dropwise over a sufficient period of 2 minutes. In the above case, the reaction solution was stirred at a constant speed and the synthesis was completed in 110 minutes.

(II) 48 g of NaOH was dissolved into 1 l of water, with subsequent dissolving of 48.8 g of $K_2S_2O_8$ thereinto for maintaining at a temperature of 60° C., and into the resultant solution thus obtained, a solution prepared by dissolving 51 g of $AgNO_3$ into 0.1 l of water was added dropwise over a sufficient period of 2 minutes. In the above case, the reaction solution was kept to be stirred at a constant speed for reaction over a period of 100 minutes. Subsequently, a solution prepared by dissolving 1.79 g of $Cd(NO_3)_2.4H_2O$ into 0.05 l of water was added dropwise to said solution being stirred over a period within 1 minute for reaction over a period of 10 minutes.

After removal of the supernatant solution for the AgO obtained in the above reactions (I) and (II), with subsequent washing by distilled water to sufficiently remove the alkaline component and drying at a temperature below 60° C., the resultant AgO was obtained. Results of gas generating test carried out in a water solution of 10 mol KOH/l at a temperature of 70° C. on the AgO thus obtained by the above reaction (I) and (II) are given in the following table.

| AgO samples | Gas generating rate (μl/hr/g) |
| --- | --- |
| (I) | 50-65 |
| (II) | 8-15 |

As is seen from the above results, if cadmium is present at the stage of AgO crystal growth, the addition thereof gives adverse effects, with the stable growth of AgO obstructed. Upon observation of AgO structures by the scanning electron microscope photographs, it was confirmed that the sample for the reaction (I) had the AgO particles thereof extremely fine. Accordingly, the present inventors intend to provide a method of manufacturing still stable AgO based on the findings that the addition of cadmium after the growth of AgO crystal is the most effective.

Although some effect was noticeable even when CdO particles of 0.05 to 20 parts by weight were mixed into AgO prepared by the AgO synthesizing method described earlier, such effect was smaller than that in the present invention, and it was confirmed that the method according to the present invention was the best approach.

Another effect expected by the addition of cadmium is the voltage stability in AgO-Zn group batteries. It has been well known that the AgO-Zn group batteries have a high open circuit voltage at 1.85 V, with the discharge voltage thereof assuming a two-stage curve, which characteristics, however, are not preferable to power sources of electronic appliances, and various methods of effecting the discharge at voltage of one stage have been proposed. Fundamentally, such one stage discharge can not be effected unless electrical conduction is established at all portions of current collecting member through porous layers or layers of AgO or $Ag_2O$. For experiments, the R-43-type battery of IEC standards having diameter of 11.9 mm and height of 4.2 mm was employed, while powder of polyethylene fluoride was mixed into AgO by 2 weight % for pressure molding of a predetermined amount thereof into pellet shape for the positive electrode, with all surfaces except for those which correspond to the negative electrode being electrically insulated. The current collection from the AgO pellet was effected through a nickel-plated ring of iron having an internal diameter of 8 mm and electrically conductive with the positive electrode casing, while the negative electrode, separator, electrolyte, etc. were of the known structures.

In the battery having the construction as described above, positive electrode active materials prepared by the AgO described with reference to the earlier mentioned comparative experiment, AgO to which Cd described with reference to the item (I) of EXAMPLE 10 was added by 0.05 part by weight in conversion, and AgO to which Cd described with reference to the item (4) of EXAMPLE 10 was added by 20 parts by weight in conversion were employed, and after the preliminary discharge only by 5 mAH and subsequent preservation of the battery at 70° C., the voltage stability thereof was investigated, with the results as tabulated in the table below.

| Kinds of positive electrode active materials | Voltage upon constitution of battery | Voltage after preliminary discharge | Voltage after storing for 7 days | Voltage after storing for 15 days |
| --- | --- | --- | --- | --- |
| Pure AgO | 1.85(V) | 1.61(V) | 1.78(V) | 1.83(V) |
| AgO with addition of Cd by 0.05 wt % | 1.85 | 1.61 | 1.63 | 1.60 |
| AgO with addition of Cd by 20 wt % | 1.85 | 1.61 | 1.60 | 1.59 |

Through the preliminary discharge by 5 mAH, Ag layers were formed on the surface of the positive electrode active material and peripheral portion of the ring, and as a result, it was made clear that, although the battery voltage could be rendered to be the $Ag_2O$-Zn potential, difference in the voltage stability was brought about depending on addition or non-addition of cadmium.

As is seen from the above description, in the foregoing synthesizing methods of AgO proposed by the present inventors, by adding cadmium chloride or cadmium oxide at the end stage of the synthesis, it has been made possible to produce stable AgO with small amount of gas generation which has not been available up to the present, while by the addition of Cd for synthesis, the new effect with respect to the voltage stabilization of the battery has also been achieved.

Subsequently, examples with respect to the influence of washing water indispensable for the AgO manufacturing process and the effect therefrom will be given hereinbelow.

EXAMPLE 12

144 g of NaOH was dissolved in 3 l of water, with subsequent dissolving of 146.4 g of $K_2S_2O_8$ thereinto as oxidizing agent for maintaining at a temperature of 60° C., and into the resultant solution, a solution prepared by dissolving 153 g of $AgNO_3$ into 0.3 l of water was added dropwise over a period of 2 minutes. In the above case, the reaction solution was continuously stirred at a constant speed until completion of the synthesis, with the synthesis period being set to be 100 minutes.

After completion of the synthesis, sediments of AgO were divided into four portions, each of which was washed by the cleaning water for sufficient removal of the alkaline component. The kinds of the washing water employed were (1) distilled water, (2) pure water passed through the ion exchange resin and having specific resistance of 15 MΩ·cm, (3) water obtained by passing the pure water of the above item (2) through a filter having pore diameter of 3 microns, and (4) water obtained by passing the pure water of the above item (2) through a filter having pore diameter of 0.2 micron. After the washing, the sediments were dried at a temperature below 60° C., and thus the resultant AgO was obtained.

Figure 35:
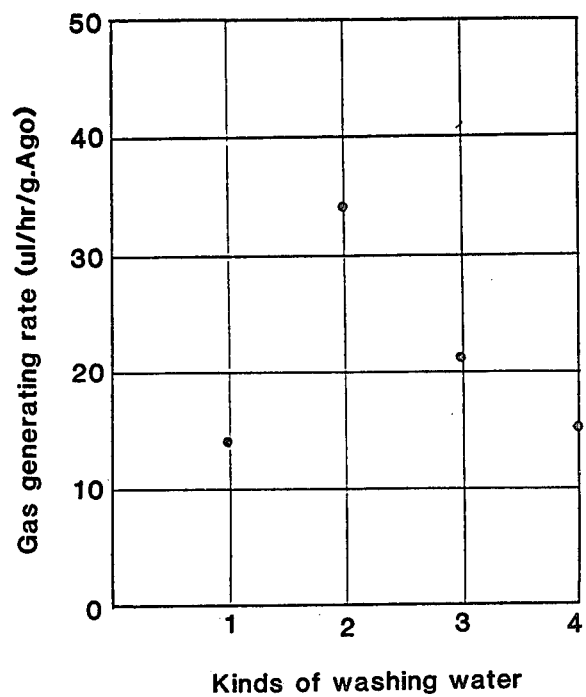
FIG. 35 is a graph showing relation between the kinds of washing water used for the synthesis of AgO of the invention and gas generating rate.

The AgO thus washed by the washing water of the above items (1) to (4) were subjected to the gas generating acceleration test for evaluation in a water solution of 10 mol KOH/l at 70° C., the results of which are shown in FIG. 35.

From the results of the graph of FIG. 35, it will be seen that even when the AgO is washed by the ion exchange pure water having the specific resistance approximately equal to the distilled water, the gas generating rate at the acceleration test is approximately twice as large as the unwashed AgO.

As the causes for the above fact, it may be considered that, since the AgO is a powerful oxidizing agent, it reacts with a slight amount of organic substance present in the washing water such as microorganisms or animal matter and plants, etc., thus causing the AgO surface layers constituting stable particles during the synthesis to be unstable. Accordingly, it is possible that the gas generation rate of AgO is largely affected by the quality of water at the washing process which is normally considered not to be very important. Such a phenomenon as described above is inherent in AgO, and even the AgO obtained by the AgO synthesizing method conventionally reported, for example, by R. H. Hammer and others shows a higher rate of the gas generation, if processed by the ion exchange pure water, than when processed by the distilled water. For obtaining pure water through the ion exchanging which is as free from the adverse effect as in the distilled water, it is necessary to completely remove the slight amount of organic substance contained in the water, and as a matter of fact, since most of the microorganisms and organic particles have sizes over 0.2 micron, they can be almost perfectly eliminated, if the ion exchange pure water is passed through a filter having pore diameter of 0.2 micron, the results of which are shown in the pure water (4) of FIG. 35, with the gas generation rate approximately equal to that of the distilled water. It is surmised that the pure water (3) was not up to the pure water (4) in FIG. 35, since the microorganisms contained therein were not removed, although comparatively large impurities were eliminated.

As is seen from the foregoing description, it has been made clear that the gas generation of AgO is not increased at the washing process if the ion exchange pure water is employed with the organic or inorganic colloidal substances, microorganisms such as living or dead bacteria, fine particles mainly consisted of silicon and nitrogen being removed therefrom, and thus it has been made possible to employ the inexpensive washing water. What required attention in the use of such washing water, however, is the multiplication of the microorganisms, and even when such microbes are once filtered away by the filter having pore diameter of 0.2 micron, multiplication takes place, if living germs are present in the water, and therefore, for storing the washing water, for example, in a tank or the like, care should be taken not to allow any living germs to enter the tank, after sterilization by ultraviolet rays or other proper sterilizing treatments. In the pure water supplying arrangement for the washing water, a device in which water is constantly circulated without being at rest or stagnant, and the filter having pore diameter of 0.2 micron is provided in a position prior to the water supplying port is most preferable from the viewpoint of removal of the fine impurities.

The concept for the above sequence may be shown as follows.

Original water (city water)→primary filter→deionization treatment→second filter having pore diameter of 3 microns→sterilization→final removing filter having pore diameter of 0.2 micron→water supplying port.

In the above process, part of the water which has passed through the final filter may be arranged to be returned to the deionization treating section.

EXAMPLE 13

The AgO obtained by the synthesis method described with reference to EXAMPLE 11 was divided into four equal portions, and before the sufficient removal of the alkaline component therefrom, was washed by the washing water as follows, i.e., (a) distilled water, (b) ion exchange pure water immediate after passing through the filter having pore diameter of 0.2 micron, (c) water obtained by allowing the pure water of the above item (b) to stand for 1 day at room temperature, and (d) water obtained by allowing the pure water of the above item (b) to stand for 5 days at room temperature. After washing the material with each of the waters as described above, the resultant AgO was obtained subsequent to drying at a temperature below 60° C. The AgO washed by the waters (a) to (d) were subjected to the gas generation acceleration test in a KOH water solution of 10 ml concentration at a temperature of 70° C. for evaluation, with findings as tabulated below.

| Washing water | (a) | (b) | (c) | (d) |
|---|---|---|---|---|
| Gas Generating rate ($\mu$l/hr/g . AgO) | 15 | 16 | 21 | 25 |

The washing water of pure water immediately after filtering by the filter having pore diameter of 0.2 micron showed favorable gas generating rate approximately equal to that of the distilled water, but when stored at room temperature for a predetermined period of time, the gas generating ability thereof is adversely affected, the cause for which is considered to be due to multiplication of the living germs present in the pure water during the storing.

As is clear from the foregoing description, according to the present invention, not only a novel divalent silver oxide stable in alkaline solution, slow in the oxygen gas generation and having a peak value different from that of the known divalent silver oxide in the X-ray diffraction chart has been provided, but an efficient manufacturing method of the divalent silver oxide of the above described type has advantageously been presented through employment of washing water prepared by subjecting the original water to the deionization and filtering through the filter having pore diameter below 0.2 micron, and thus, as a matter of fact, it has been made possible to obtain the divalent silver oxide with small amount of gas generation by the use of the inexpensive washing water as described above without employment of the expensive distilled water as washing water, even when AgO is to be produced on an industrial scale.

Although the present invention has been fully described by way of examples with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A silver-II oxide cell having a negative electrode comprising zinc and a positive electrode comprising silver-II oxide, said silver-II oxide being produced by reacting at least one member selected from the group consisting of silver salts and $Ag_2O$, a persulfate and an alkaline metal hydroxide, said silver-II oxide having an X-ray diffraction spectrum with a peak value relative intensity higher than 100 at face (200) (face interval $d=2.79_1 A$) and at face (111) (face interval $d=2.76_7 A$) and having a peak value relative intensity higher than 10 at face (313) (face interval $d=1.39_4 A$) and at face (400) (face interval $d=1.39_5 A$) on the assumption that peak value intensity at face (111) (face interval $d=2.41_3 A$) is 100 and said silver-II oxide having degree of oxidation within the range from 96 to 100%, with particle surface area thereof being smaller than 0.5 $m^2/g$.

2. The silver-II oxide cell of claim 1 wherein the silver-II oxide is produced by:
    (a) reacting in aqueous solution at a temperature of 0° to 60° C. at least one member selected from the group consisting of silver salts and silver oxide ($Ag_2O$), persulfate and alkaline metal hydroxide to produce silver-II oxide, said persulfate being used in an amount 1.0 to 1.85 times the theoretical amount thereof, with its concentration in aqueous solution being in the range from 0.04 to 0.72 mol/l, and said alkaline metal hydroxide being used in amount 1.05 to 6.0 times the theoretical amount thereof, with its concentration in aqueous solution being in the range from 0.3 to 4.8 mol/l and
    (b) water washing and drying said divalent silver oxide thus produced.

3. The silver-II oxide cell of claim 2 wherein there is added to the thus-produced silver-II oxide, at least one cadmium compound selected from the group consisting of cadmium salts and cadmium oxide in an amount of 0.05 to 20 parts by weight based on the amount of cadmium, per 100 parts by weight of silver.

* * * * *